(12) United States Patent
Takizawa

(10) Patent No.: US 11,674,974 B2
(45) Date of Patent: Jun. 13, 2023

(54) INERTIAL SENSOR, ELECTRONIC DEVICE, AND VEHICLE

(71) Applicant: SEIKO EPSON CORPORATION, Tokyo (JP)

(72) Inventor: Teruo Takizawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 105 days.

(21) Appl. No.: 16/793,599

(22) Filed: Feb. 18, 2020

(65) Prior Publication Data

US 2020/0271688 A1 Aug. 27, 2020

(30) Foreign Application Priority Data

Feb. 21, 2019 (JP) .............................. JP2019-029902

(51) Int. Cl.
  *G01P 15/125* (2006.01)
  *G01P 15/08* (2006.01)
  *B60R 21/0132* (2006.01)

(52) U.S. Cl.
  CPC ........ *G01P 15/125* (2013.01); *B60R 21/0132* (2013.01); *G01P 15/0891* (2013.01); *B60R 2021/01325* (2013.01)

(58) Field of Classification Search
  CPC .... G01P 15/0891; G01P 15/125; G01P 15/18; G01P 2015/0831
  See application file for complete search history.

(56) References Cited

U.S. PATENT DOCUMENTS

| | | | |
|---|---|---|---|
| 5,814,892 A | 9/1998 | Steidl et al. | |
| 6,251,768 B1* | 6/2001 | Lin .......................... | H01L 24/05 438/617 |
| 6,590,296 B2* | 7/2003 | Nakamura .............. | H01L 24/06 257/786 |
| 9,321,627 B2* | 4/2016 | Furuhata ................. | B81B 7/007 |
| 9,764,940 B2 | 9/2017 | Tanaka | |
| 2002/0149888 A1* | 10/2002 | Motonishi ................ | G11B 5/40 360/323 |
| 2012/0262030 A1* | 10/2012 | Kojo .................... | H03H 9/0542 310/348 |
| 2017/0010298 A1* | 1/2017 | Tanaka .................. | G01P 15/125 |
| 2018/0156840 A1* | 6/2018 | Kigure .................... | G01P 15/08 |

FOREIGN PATENT DOCUMENTS

| JP | H08-186144 | 7/1996 |
| JP | H10-125718 | 5/1998 |
| JP | H11-195669 | 7/1999 |
| JP | 2005-249454 | 9/2005 |
| JP | 2015-206648 | 11/2015 |
| JP | 2018-107363 | 7/2018 |

* cited by examiner

*Primary Examiner* — David Z Huang
*Assistant Examiner* — Jean F Morello
(74) *Attorney, Agent, or Firm* — Workman Nydegger

(57) ABSTRACT

An inertial sensor includes a substrate, a sensor element provided on the substrate, a lid that covers the sensor element and is bonded to the substrate, and a plurality of terminals positioned outside the lid and electrically coupled to the sensor element, in which the plurality of terminals include an input terminal to which an electrical signal is input and a detection terminal for detecting a signal from the sensor element, and L1>L2, where L1 is a distance between the input terminal and the lid, and L2 is a distance between the detection terminal and the lid.

12 Claims, 23 Drawing Sheets

INERTIAL SENSOR, ELECTRONIC DEVICE, AND VEHICLE

The present application is based on, and claims priority from JP Application Serial Number 2019-029902, filed Feb. 21, 2019, the disclosure of which is hereby incorporated by reference herein in its entirety.

BACKGROUND

1. Technical Field

The present disclosure relates to an inertial sensor, an electronic device, and a vehicle.

2. Related Art

In JP-A-10-125718, an integrated circuit including a plurality of bonding pads arranged in a staggered manner is described. Specifically, when an outer ring along an outer edge of the integrated circuit and an inner ring positioned inside the outer ring are set, the plurality of bonding pads include outer bonding pads positioned on the outer ring and inner bonding pads positioned on the inner ring.

As such, in JP-A-10-125718, matters that the bonding pads are arranged in a staggered manner are described, but it is unclear what signals are input to and output from which bonding pads. For example, in the case of a MEMS sensor, a detection signal output for an input drive signal is small. For that reason, there has been a problem that the bonding pad for the detection signal needs to be as far as possible from a noise source.

SUMMARY

An inertial sensor according to an aspect of the disclosure includes a substrate, a sensor element that is provided on the substrate, a lid that covers the sensor element and is bonded to the substrate, and a plurality of terminals that are positioned outside the lid and electrically coupled to the sensor element, in which the plurality of terminals include an input terminal to which an electrical signal is input and a detection terminal for detecting a signal from the sensor element, and L1>L2, where L1 is a distance between the input terminal and the lid, and L2 is a distance between the detection terminal and the lid.

DESCRIPTION OF EXEMPLARY EMBODIMENTS

Hereinafter, an inertial sensor, an electronic device, and a vehicle according to the present disclosure will be described in detail based on embodiments illustrated in the accompanying drawings.

First Embodiment

Figure 1:
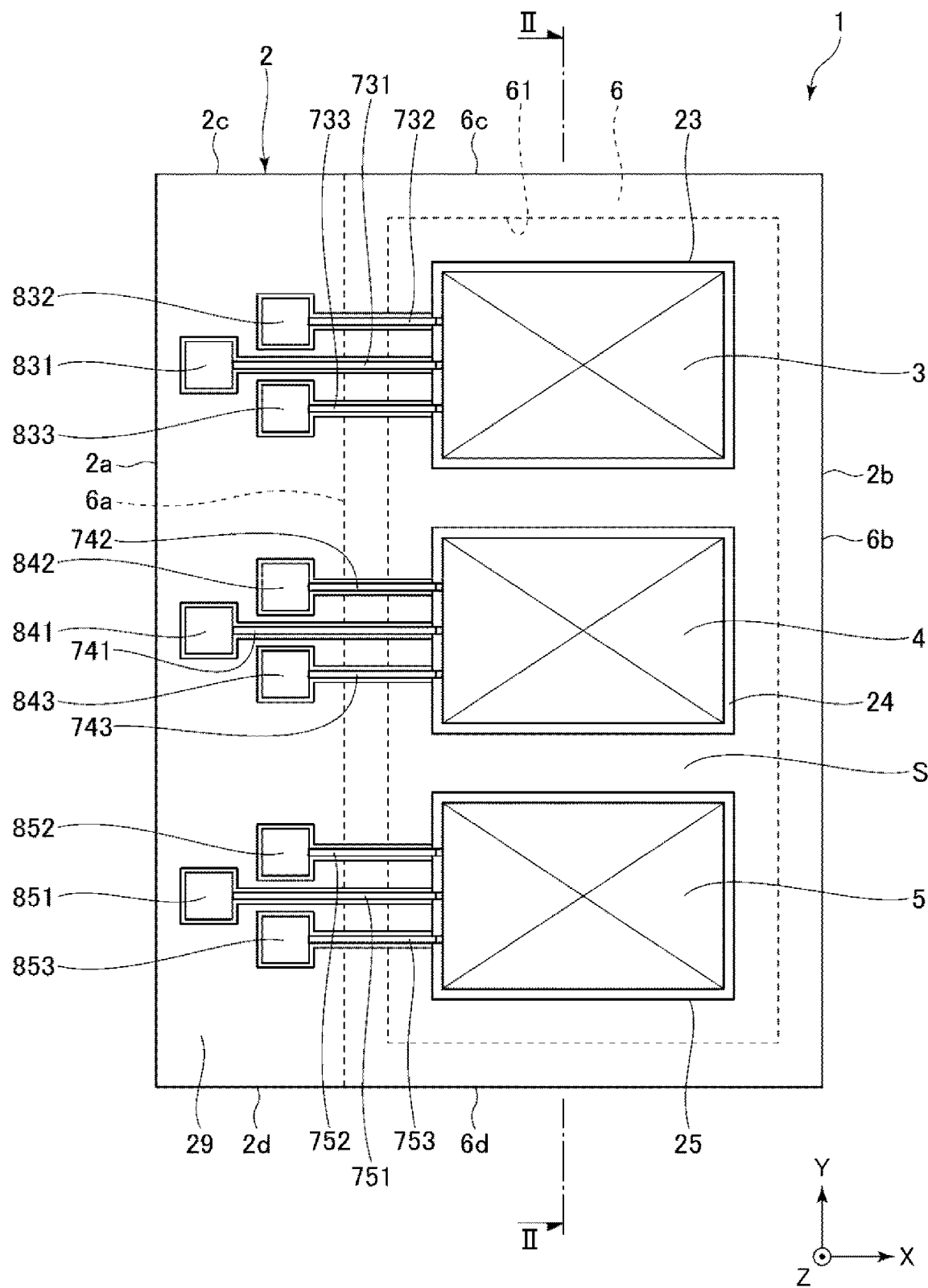
FIG. 1 is a plan view illustrating an inertial sensor according to a first embodiment.
Figure 2:
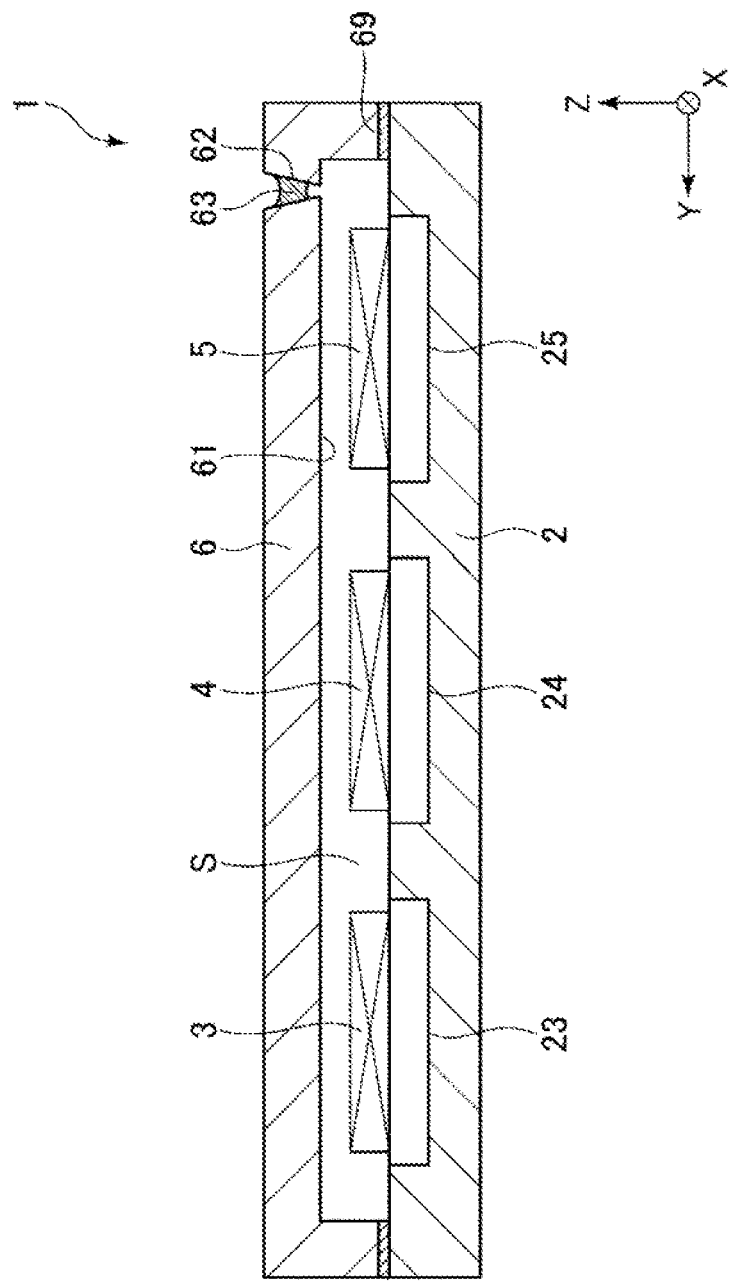
FIG. 2 is a cross-sectional view taken along line II-II in FIG. 1.
Figure 3:
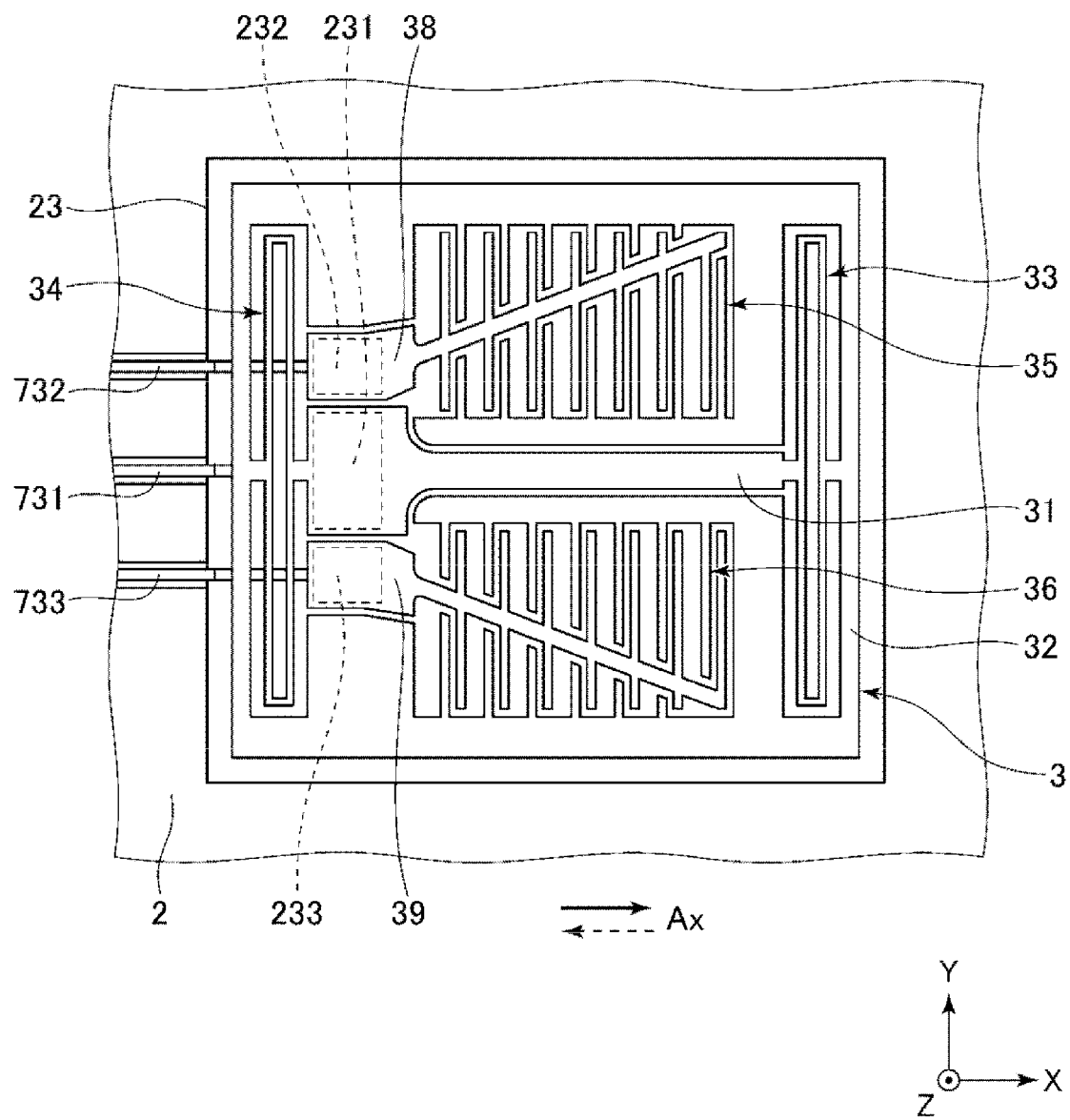
FIG. 3 is a plan view illustrating an example of a sensor element that measures acceleration in the X-axis direction.
Figure 4:
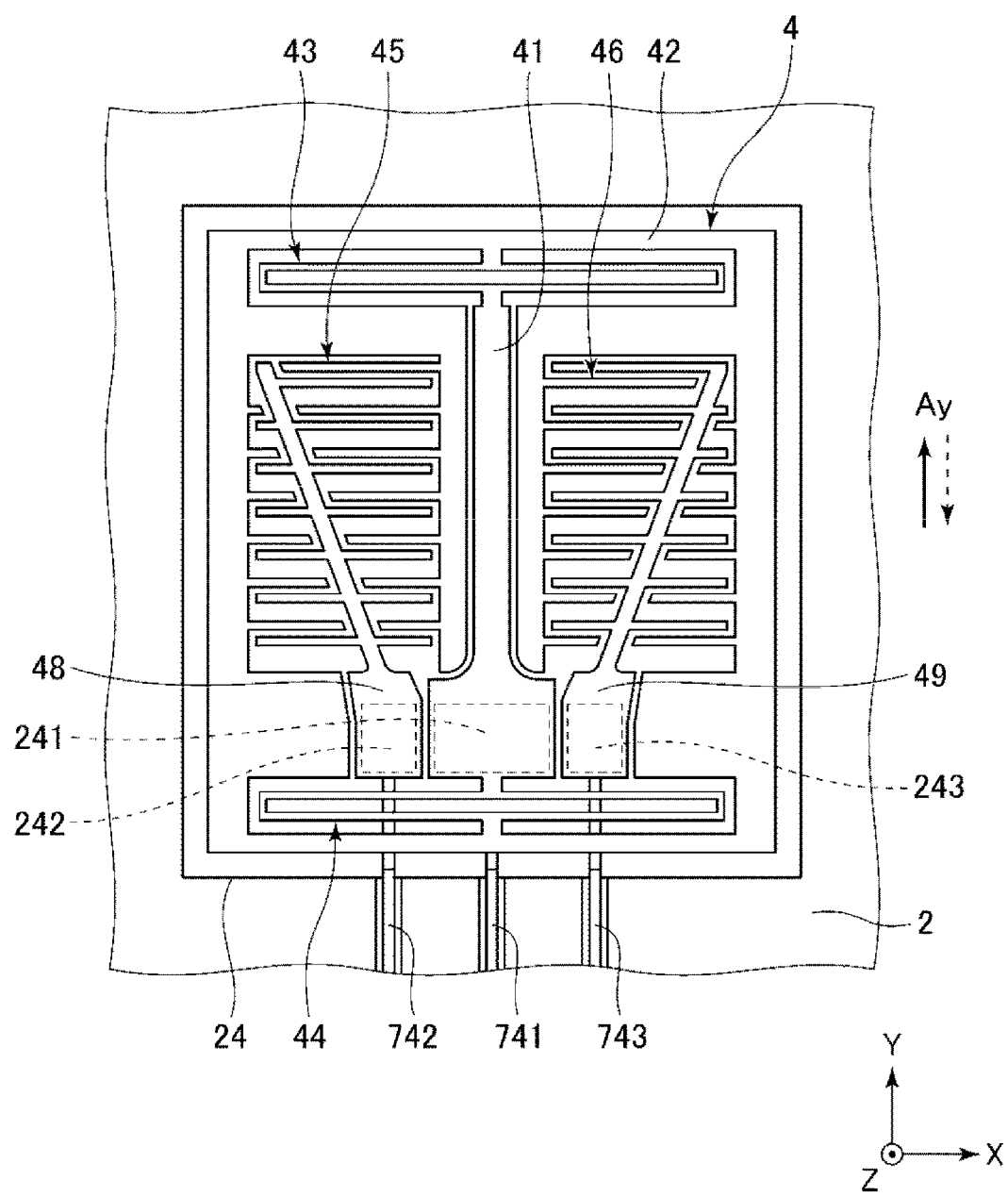
FIG. 4 is a plan view illustrating an example of a sensor element that measures acceleration in the Y-axis direction.
Figure 5:
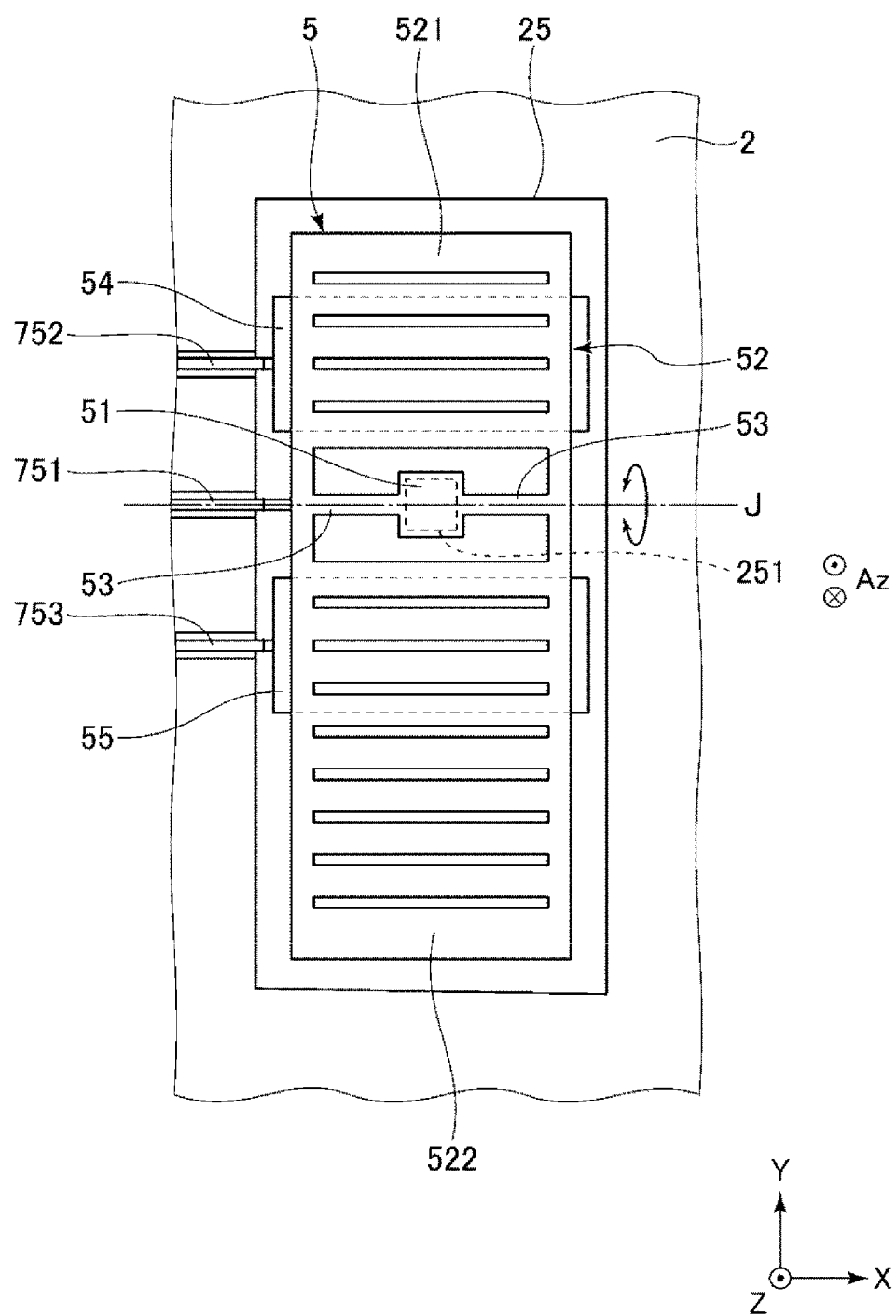
FIG. 5 is a plan view illustrating an example of a sensor element that measures acceleration in the Z-axis direction.
Figure 6:
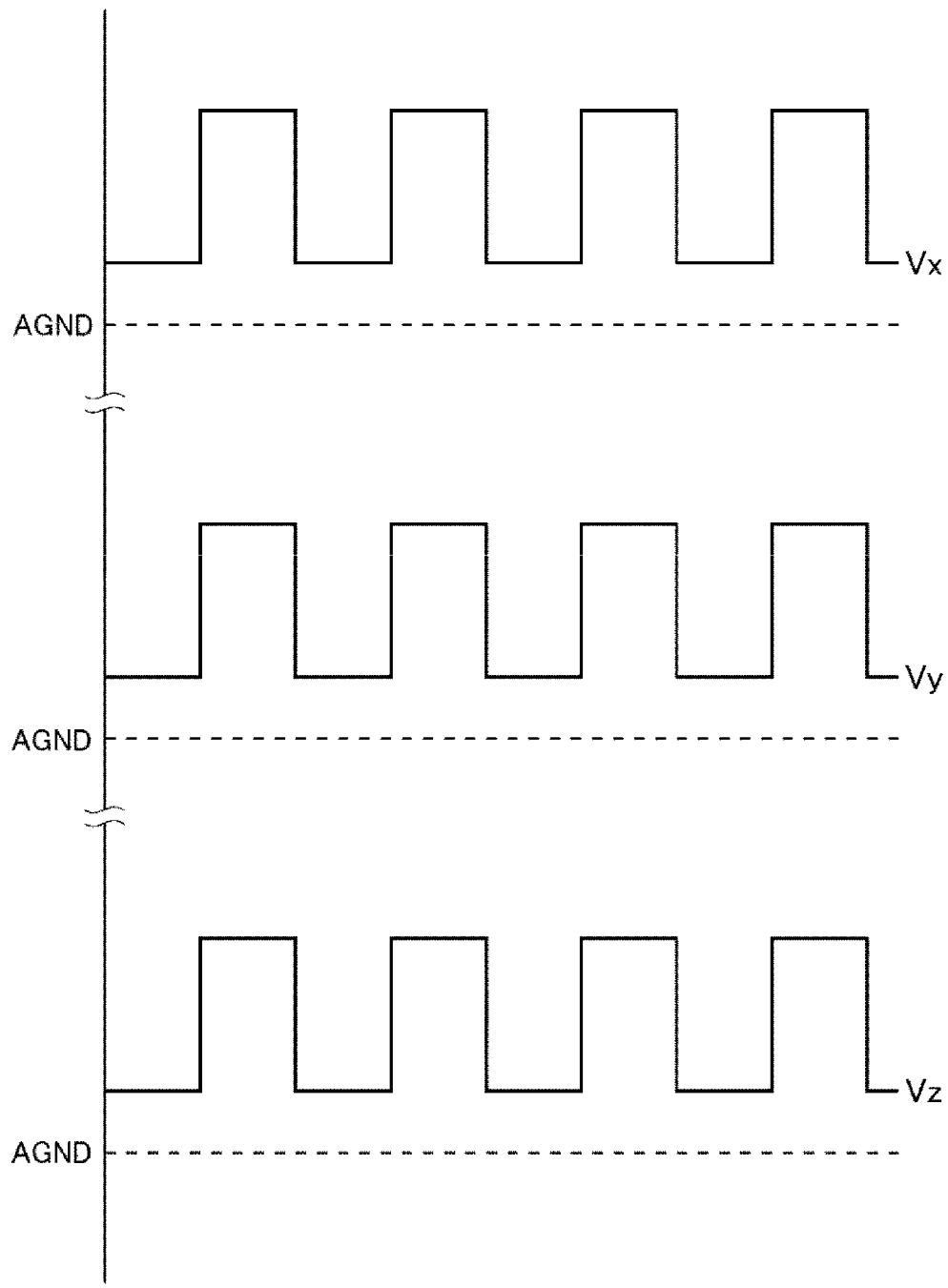
FIG. 6 is a graph illustrating an example of a drive voltage applied to each sensor element.
Figure 7:
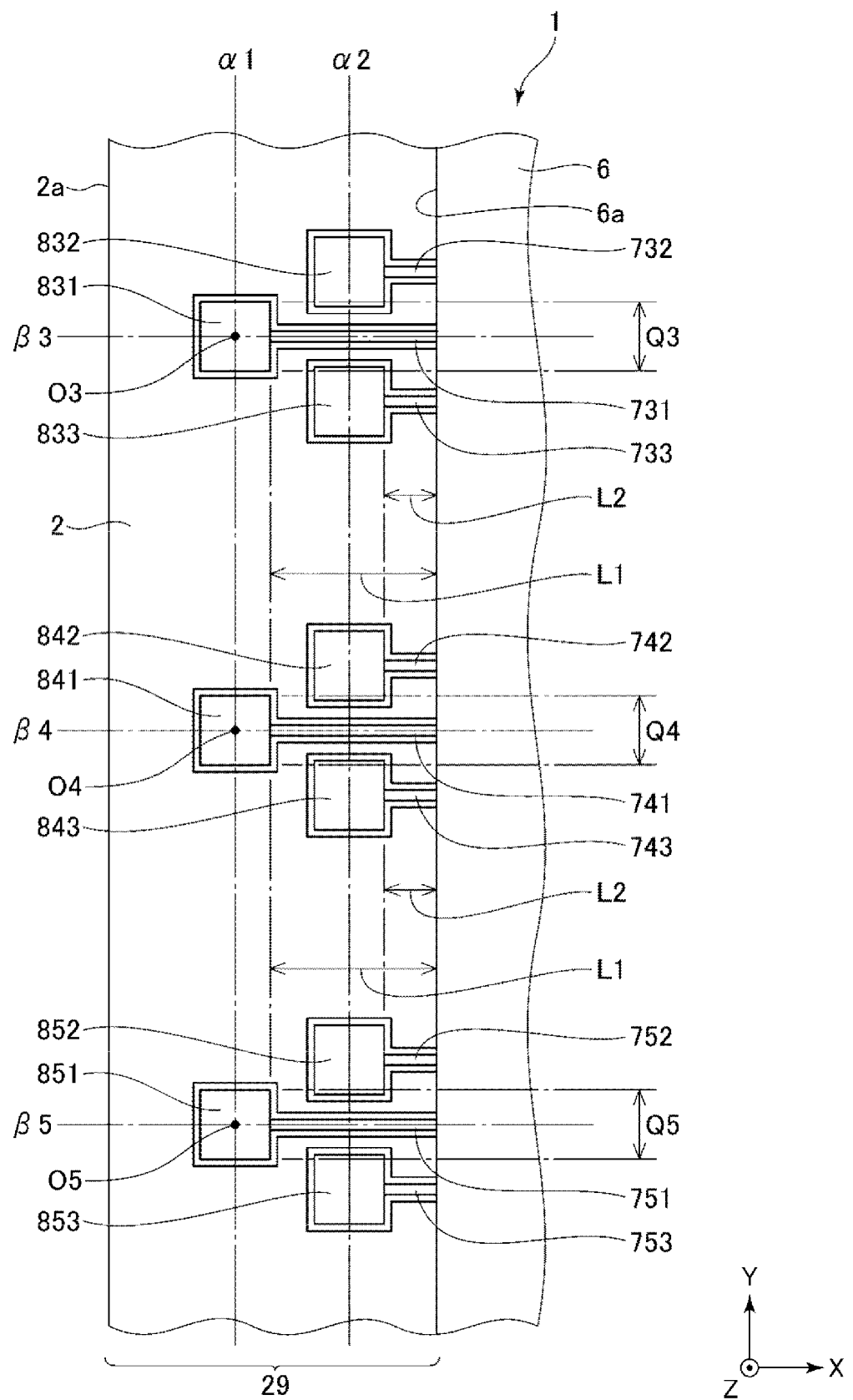
FIG. 7 is a partially enlarged plan view illustrating an exposed portion of the inertial sensor.

FIG. 1 is a plan view illustrating an inertial sensor according to a first embodiment. FIG. 2 is a cross-sectional view taken along line II-II in FIG. 1. FIG. 3 is a plan view illustrating an example of a sensor element that measures acceleration in the X-axis direction. FIG. 4 is a plan view illustrating an example of a sensor element that measures acceleration in the Y-axis direction. FIG. 5 is a plan view illustrating an example of a sensor element that measures acceleration in the Z-axis direction. FIG. 6 is a graph illustrating an example of a drive voltage applied to each sensor element. FIG. 7 is a partially enlarged plan view illustrating an exposed portion of the inertial sensor.

In each drawing, the X-axis, Y-axis, and Z-axis are illustrated as three axes orthogonal to each other. A direction along the X-axis, that is, a direction parallel to the X-axis is referred to as an "X-axis direction", a direction along the Y-axis is referred as a "Y-axis direction", and a direction along the Z-axis is referred as a "Z-axis direction". A tip end side of the arrow of each axis is also referred to as a "plus side", and the opposite side is also referred to a "minus side". In addition, the plus side in the Z-axis direction is also referred to as "upper", and the minus side in the Z-axis direction is also referred to as "lower". In the specification of the present application, the term "orthogonal to" includes not only a case where constituent elements intersect at 90° but also a case where the constituent elements intersect at an angle slightly inclined from 90°, for example, within a range of 90°±5°.

The inertial sensor 1 illustrated in FIG. 1 is an acceleration sensor that can independently measure accelerations in the X-axis direction, the Y-axis direction, and the Z-axis direction that are orthogonal to each other. Such an inertial sensor 1 includes a substrate 2, three sensor elements 3, 4, and 5 provided on the substrate 2, and a lid 6 that accommodates the sensor elements 3, 4, and 5 and is bonded to the substrate 2. The functions of the three sensor elements 3, 4, and 5 are as follows: the sensor element 3 detects an acceleration Ax in the X-axis direction, the sensor element 4 detects an acceleration Ay in the Y-axis direction, and the sensor element 5 detects an acceleration Az in the Z-axis direction. In FIG. 1, for convenience of explanation, the sensor elements 3, 4, and 5 are illustrated in a simplified manner.

A configuration of the inertial sensor 1 is not limited to the configuration described above, and, for example, an arrangement, shape, function, and the like of the sensor elements 3, 4, and 5 may be different from the illustrated configuration. For example, one or two of the sensor elements 3, 4, and 5 may be omitted. A sensor element that can measure the angular velocity may be used instead of or in addition to the sensor elements 3, 4, and 5.

The substrate 2 is rectangular in plan view from the Z-axis direction, and includes a pair of sides 2a and 2b extending in the Y-axis direction and a pair of sides 2c and 2d extending in the X-axis direction. As illustrated in FIG. 1, the substrate 2 includes three concave portions 23, 24, and 25 that open to the upper surface. The sensor element 3 is provided so as to overlap the concave portion 23, the sensor element 4 is provided so as to overlap the concave portion 24, and the sensor element 5 is provided so as to overlap the concave portion 25. Contact between the sensor elements 3, 4, and 5 and the substrate 2 is suppressed by these concave portions 23, 24, and 25.

As such a substrate 2, for example, a glass substrate made of a glass material containing alkali metal ions such as sodium ions, specifically, borosilicate glass such as Tempax glass and Pyrex glass (both registered trademark) can be used. However, a constituent material of the substrate 2 is not particularly limited, and a silicon substrate, a ceramic substrate, and the like may be used.

As illustrated in FIG. 1, the lid 6 is rectangular in plan view, and has a pair of sides 6a and 6b extending in the Y-axis direction, and a pair of sides 6c and 6d extending in the X-axis direction. The lid 6 also has a concave portion 61 that opens to the lower surface. As illustrated in FIG. 2, the lid 6 is bonded to the upper surface of the substrate 2 with the sensor elements 3, 4, and 5 accommodated in the concave portion 61 formed inside thereof. The lid 6 and the substrate 2 form an accommodation space S in which the sensor elements 3, 4, and 5 are airtightly accommodated. The lid 6 is provided with a through-hole 62 that communicates the inside and outside of the accommodation space S and the through-hole 62 is sealed with a sealing material 63.

The accommodation space S may be filled with inert gas such as nitrogen, helium, or argon, and may be at approximately atmospheric pressure at an operating temperature (for example, approximately −40° C. to 80° C.). By setting the accommodation space S to atmospheric pressure, viscous resistance is increased and a damping effect is exhibited, so that vibrations of the sensor elements 3, 4, and 5 can be quickly converged. For that reason, a detection accuracy of the inertial sensor 1 is improved.

As such a lid 6, for example, a silicon substrate can be used. However, the lid 6 is not particularly limited, and for example, a glass substrate or a ceramic substrate may be used as the lid 6. Although a bonding method between the substrate 2 and the lid 6 is not particularly limited and may be appropriately selected depending on the materials of the substrate 2 and the lid 6, in the first embodiment, the substrate 2 and the lid 6 are bonded through a bonding member 69 formed over the circumference of the lower surface of the lid 6. As the bonding member 69, for example, a glass frit material which is low melting point glass can be used.

As illustrated in FIG. 1, the lid 6 is provided so as to be biased toward the plus side in the X-axis direction, which is the first direction of the substrate 2, the sides 6b, 6c, and 6d coincide with the sides 2b, 2c, and 2d of the substrate 2, and the side 6a is positioned at the plus side in the X-axis direction from the side 2a. A portion on the minus side in the X-axis direction of the substrate 2 is exposed from the lid 6. Hereinafter, the exposed portion, that is, the portion between the side 2a and the side 6a is also referred to as an "exposed portion 29".

The substrate 2 has a groove which opens to the upper surface thereof, and a plurality of wirings 731, 732, 733, 741, 742, 743, 751, 752, and 753 and terminals 831, 832, 833, 841, 842, 843, 851, 852, and 853 are provided in the groove. The wirings 731, 732, 733, 741, 742, 743, 751, 752, and 753 are provided inside and outside of the accommodation space S, and, among these wirings, the wirings 731, 732, and 733 are electrically coupled to the sensor element 3, the wirings 741, 742, and 743 are electrically coupled to the sensor element 4, and the wirings 751, 752, and 753 are electrically coupled to the sensor element 5. Terminals 831, 832, 833, 841, 842, 843, 851, 852, and 853 are respectively provided on the exposed portion 29, that is, outside the lid 6. Then, the terminal 831 is electrically coupled to the wiring 731, the terminal 832 is electrically coupled to the wiring 732, the terminal 833 is electrically coupled to the wiring 733, the terminal 841 is electrically coupled to the wiring 741, The terminal 842 is electrically coupled to the wiring 742, the terminal 843 is electrically coupled to the wiring 743, the terminal 851 is electrically coupled to the wiring 751, the terminal 852 is electrically coupled to the wiring 752, and the terminal 853 is electrically coupled to the wiring 753.

The constituent materials of the wiring 731, 732, 733, 741, 742, 743, 751, 752, and 753 and terminals 831, 832, 833, 841, 842, 843, 851, 852, and 853 are not particularly limited, examples of the constituent materials include metal materials such as gold (Au), silver (Ag), platinum (Pt), palladium (Pd), iridium (Ir), copper (Cu), aluminum (Al), nickel (Ni), chromium (Cr), Ti (titanium) and tungsten (W), alloys containing these metal materials, and oxide-based conductive materials such as indium tin oxide (ITO), indium zinc oxide (IZO), ZnO and IGZO, and one or more of these constituent materials can be used in combination (for example, as a laminate of two or more layers).

Next, the sensor elements 3, 4, and 5 will be described with reference to FIGS. 3 to 5. The sensor elements 3, 4, and 5 can be collectively formed by, for example, anodically bonding a silicon substrate doped with impurities such as phosphorus (P), boron (B), and arsenic (As) to the upper surface of the substrate 2 and patterning the silicon substrate by a Bosch process that is a deep groove etching technique. However, the method of forming the sensor elements 3, 4, and 5 is not limited thereto.

The sensor element 3 can measure the acceleration Ax in the X-axis direction. As such a sensor element 3, for example, as illustrated in FIG. 3, the sensor element 3 includes a fixed portion 31 fixed to a mount 231 protruding from the bottom surface of the concave portion 23, a movable body 32 displaceable in the X-axis direction with respect to the fixed portion 31, springs 33 and 34 coupling the fixed portion 31 and the movable body 32, a first movable electrode 35 and a second movable electrode 36 provided in the movable body 32, a first fixed electrode 38 fixed to a mount 232 protruding from the bottom surface of the concave portion 23 and facing the first movable electrode 35, and a second fixed electrode 39 fixed to a mount 233 protruding from the bottom surface of the concave portion 23 and facing the second movable electrode 36.

The first and second movable electrodes 35 and 36 are electrically coupled to the wiring 731 in the fixed portion 31, the first fixed electrode 38 is electrically coupled to the wiring 732, and the second fixed electrode 39 is electrically coupled to the wiring 733. Then, for example, a drive voltage Vx in which a DC voltage and an AC voltage as illustrated in FIG. 6 are superimposed is applied to the first and second movable electrodes 35 and 36 through the terminal 831. On the other hand, a fixed voltage AGND (analog ground) is applied to the first and second fixed electrodes 38 and 39, and the first and second fixed electrodes 38 and 39 are coupled to a charge amplifier through the terminals 832 and 833. For that reason, capacitance Cx1 is formed between the first movable electrode 35 and the first fixed electrode 38 and capacitance Cx2 is formed between the second movable electrode 36 and the second fixed electrode 39. When a voltage difference is generated between the drive voltage Vx and the fixed voltage AGND, charges corresponding to the voltage difference are induced between the first movable electrode 35 and the first fixed electrode 38 and between the second movable electrode 36 and the second fixed electrode 39. When a charge amount induced between the first movable electrode 35 and the first fixed electrode 38 and a charge amount induced between the second movable electrode 36 and the second fixed electrode 39 are the same, a voltage value generated in the charge amplifier is zero. This represents that the acceleration Ax applied to the sensor element 3 is zero (stationary state).

Then, when the acceleration Ax is applied to the sensor element 3 in a state where the capacitances Cx1 and Cx2 are formed, the movable body 32 is displaced in the X-axis direction, and accordingly, the capacitances Cx1 and Cx2 change in opposite phases. For that reason, the charge amount induced between the first movable electrode 35 and the first fixed electrode 38 and the charge amount induced between the second movable electrode 36 and the second fixed electrode 39 also change, based on the change in the capacitances Cx1 and Cx2. When a difference occurs between the charge amount induced between the first movable electrode 35 and the first fixed electrode 38 and the charge amount induced between the second movable electrode 36 and the second fixed electrode 39, the difference is output as the voltage value of the charge amplifier. In this way, the acceleration Ax received by the sensor element 3 can be obtained.

The sensor element 4 can measure the acceleration Ay in the Y-axis direction. Such a sensor element 4 is not particularly limited, but, for example, as illustrated in FIG. 4, can be configured by rotating the sensor element 3 described above by 90 degrees around the Z-axis. That is, the sensor element 4 includes a fixed portion 41 fixed to a mount 241 protruding from the bottom surface of the concave portion 24, a movable body 42 displaceable in the Y-axis direction with respect to the fixed portion 41, springs 43 and 44 coupling the fixed portion 41 and the movable body 42, a first movable electrode 45 and a second movable electrode 46 provided in the movable body 42, a first fixed electrode 48 fixed to a mount 242 protruding from the bottom surface of the concave portion 24 and facing the first movable electrode 45, and a second fixed electrode 49 fixed to a mount 243 protruding from the bottom surface of the concave portion 24 and facing the second movable electrode 46.

The first and second movable electrodes 45 and 46 are electrically coupled to the wiring 741 in the fixed portion 41, the first fixed electrode 48 is electrically coupled to the wiring 742, and the second fixed electrode 49 is electrically coupled to the wiring 743. Then, for example, a drive voltage Vy in which a DC voltage and an AC voltage as illustrated in FIG. 6 are superimposed is applied to the first and second movable electrodes 45 and 46 through the terminal 841. On the other hand, the fixed voltage AGND is applied to the first and second fixed electrodes 48 and 49, and the first and second fixed electrodes 48 and 49 are coupled to the charge amplifier through the terminals 842 and 843. For that reason, capacitance Cy1 is formed between the first movable electrode 45 and the first fixed electrode 48 and capacitance Cy2 is formed between the second movable electrode 46 and the second fixed electrode 49. When a voltage difference is generated between the drive voltage Vy and the fixed voltage AGND, charges corresponding to the voltage difference are induced between the first movable electrode 45 and the first fixed electrode 48 and between the second movable electrode 46 and the second fixed electrode 49. When a charge amount induced between the first movable electrode 45 and the first fixed electrode 48 and a charge amount induced between the second movable electrode 46 and the second fixed electrode 49 are the same, a voltage value generated in the charge amplifier is zero. This represents that the acceleration Ay applied to the sensor element 4 is zero (stationary state).

Then, when the acceleration Ay is applied to the sensor element 4 in a state where the capacitances Cy1 and Cy2 are formed, the movable body 42 is displaced in the Y-axis direction, and accordingly, the capacitances Cy1 and Cy2 change in opposite phases. For that reason, the charge amount induced between the first movable electrode 45 and the first fixed electrode 48 and the charge amount induced between the second movable electrode 46 and the second fixed electrode 49 also change, based on the change in the capacitances Cy1 and Cy2. When a difference occurs between the charge amount induced between the first movable electrode 45 and the first fixed electrode 48 and the charge amount induced between the second movable electrode 46 and the second fixed electrode 49, the difference is output as the voltage value of the charge amplifier. In this way, the acceleration Ay received by the sensor element 4 can be obtained.

The sensor element 5 can measure the acceleration Az in the Z-axis direction. Such a sensor element 5 is not particularly limited, but, for example, as illustrated in FIG. 5, includes a fixed portion 51 fixed to amount 251 protruding from the bottom surface of the concave portion 25 and a movable body 52 that is coupled to the fixed portion 51 through a beam 53 and is swingable around a swing axis J along the X-axis with respect to the fixed portion 51. In the movable body 52, the first movable portion 521 positioned at one side of the swing axis J and the second movable portion 522 positioned at the other side thereof have different rotational moments around the swing axis J. The sensor element 5 is provided on the bottom surface of the concave portion 25, and includes a first fixed electrode 54 provided to face the first movable portion 521 and a second fixed electrode 55 provided to face the second movable portion 522.

The movable body 52 is electrically coupled to the wiring 751 in the fixed portion 51, the first fixed electrode 54 is electrically coupled to the wiring 752, and the second fixed electrode 55 is electrically coupled to the wiring 753. Then, for example, a drive voltage Vz in which a DC voltage and an AC voltage as illustrated in FIG. 6 are superimposed is applied to the movable body 52 through the terminal 851. On the other hand, the fixed voltage AGND is applied to the first and second fixed electrodes 54 and 55, and the first and second fixed electrodes 54 and 55 are coupled to the charge amplifier through the terminals 852 and 853. For that reason, capacitance Cz1 is formed between the first movable portion 521 and the first fixed electrode 54 and capacitance Cz2 is formed between the second movable portion 522 and the second fixed electrode 55. When a voltage difference is generated between the drive voltage Vz and the fixed voltage AGND, charges corresponding to the voltage difference are induced between the first movable portion 521 and the first fixed electrode 54 and between the second movable portion 522 and the second fixed electrode 55. When a charge amount induced between the first movable portion 521 and the first fixed electrode 54 and a charge amount induced between the second movable portion 522 and the second fixed electrode 55 are the same, a voltage value generated in the charge amplifier is zero. This represents that the acceleration Az applied to the sensor element 5 is zero (stationary state).

Then, when the acceleration Az is applied to the sensor element 5 in a state where the capacitances Cz1 and Cz2 are formed, the movable body 52 is displaced around the swing axis J, and accordingly, the capacitances Cz1 and Cz2 change in opposite phases. For that reason, the charge amount induced between the first movable portion 521 and the first fixed electrode 54 and the charge amount induced between the second movable portion 522 and the second fixed electrode 55 also change, based on the change in the capacitances Cz1 and Cz2. When a difference occurs between the charge amount induced between the first movable portion 521 and the first fixed electrode 54 and the charge amount induced between the second movable portion 522 and the second fixed electrode 55, the difference is output as the voltage value of the charge amplifier. In this way, the acceleration Az received by the sensor element 5 can be obtained.

Although the sensor elements 3, 4, and 5 have been described as above, the configurations of the sensor elements 3, 4, and 5 are not particularly limited as long as the accelerations Ax, Ay, and Az can be detected, respectively.

Next, the disposition of the terminals 831, 832, 833, 841, 842, 843, 851, 852, and 853 will be described in more detail. As described above, the terminals 831, 832, 833, 841, 842, 843, 851, 852, and 853 are respectively provided on the exposed portion 29 of the substrate 2. That is, the terminals 831, 832, 833, 841, 842, 843, 851, 852, and 853 are provided together on one side in the X-axis direction that is a first direction with respect to the lid 6, in this embodiment, on the minus side in the first embodiment. With this configuration, the inertial sensor 1 can be reduced in size and is advantageous for mounting work such as wire bonding. However, the present disclosure is not limited thereto, and for example, the terminals 831, 832, 833, 841, 842, 843, 851, 852, and 853 may be provided separately on one side and the other side in the X-axis direction with respect to the lid 6.

The terminals 831, 832, and 833 are electrically coupled to the sensor element 3. The terminal 831 is an input terminal for applying a drive voltage Vx to the sensor element 3, and the terminals 832 and 833 are detection terminals for detecting detection signals from the sensor element 3, that is, charges corresponding to the capacitances Cx1 and Cx2. Similarly, the terminals 841, 842, and 843 are electrically coupled to the sensor element 4. The terminal 841 is an input terminal for applying a drive voltage Vy to the sensor element 4, and the terminals 842 and 843 are detection terminals for detecting detection signals from the sensor element 4, that is, charges corresponding to the capacitances Cy1 and Cy2. Similarly, the terminals 851, 852, and 853 are electrically coupled to the sensor element 5. The terminal 851 is an input terminal for applying a drive voltage Vz to the sensor element 5, and the terminals 852 and 853 are detection terminals for detecting detection signals from the sensor element 5, that is, charges corresponding to the capacitances Cz1 and Cz2.

As such, in the terminals 831, 832, 833, 841, 842, 843, 851, 852, and 853, the terminals 831, 841, and 851 that are input terminals, and the terminals 832, 833, 842, 843, 852, and 853 that are detection terminals are included. As illustrated in FIG. 7, the terminals 832, 833, 842, 843, 852, and 853 that are detection terminals are provided closer to the lid 6 than the terminals 831, 841, and 851 that are input terminals. That is, when a distance between the terminals 831, 841, and 851 that are input terminals and the side 6a of the lid 6 is L1, and a distance between the terminals 832, 833, 842, 843, 852, and 853 that are detection terminals and the side 6a of the lid 6 is L2, the relationship is of L1>L2 is satisfied. The relationship of 1.2≤L1/L2≤10 is preferred. By satisfying such a relationship, the length of the detection wiring 732, 733, 742, 743, 752, and 753, especially the length of the portion exposed to the outside of the lid 6 can be further shortened, and the detection signal is hardly affected by disturbance. For that reason, noise is less likely to be mixed into the detection signal, and the accelerations Ax, Ay, and Az can be detected with higher accuracy. In particular, the detected charge amount is a weak charge amount with respect to the drive voltages Vx, Vy, and Vz, and as a wiring length on the substrate (dielectric material) increases, parasitic capacitance increases and the amount of charge that can be extracted decreases. For that reason, the configuration described above becomes more effective. The L1/L2 may be the same for each group of terminals or may be different for each group.

In the first embodiment, the group of terminals 831, 832, and 833 coupled to the sensor element 3 satisfies the relationship of L1>L2, the group of terminals 841, 842, and 843 coupled to the sensor element 4 satisfies the relationship of L1>L2, and the group of terminals 851, 852, and 853 coupled to the sensor element 5 satisfies the relationship L1>L2, but the present disclosure is not limited thereto, and it suffices that at least one of the group of terminals 831, 832, and 833, the group of terminals 841, 842, and 843, and the group of terminals 851, 852, and 853 satisfies the relationship of L1>L2.

Here, as illustrated in FIG. 7, two imaginary lines α1 and α2 extending in the Y-axis direction are set so as to overlap the exposed portion 29 in plan view from the Z-axis direction. The imaginary lines α1 and α2 are set to be separated from each other in the X-axis direction, and the imaginary line α1 is positioned at the minus side in the X-axis direction with respect to the imaginary line α2, that is, on the side far from the lid 6. The terminals 831, 841, and 851 that are input terminals are respectively provided in a row along the imaginary line α1 and are substantially equidistant from the side 6a. The terminals 832, 833, 842, 843, 852, and 853 that are detection terminals are respectively provided in a row along the imaginary line α2 and are substantially equidistant from the side 6a. With this configuration, the terminals 831, 832, 833, 841, 842, 843, 851, 852, and 853 are regularly arranged, and the inertial sensor 1 can be reduced in size. However, the present disclosure is not limited thereto, and at least one of the terminals 831, 841, and 851 may be provided so as to deviate from the imaginary line α1, or at least one of the terminals 832, 833, 842, 843, 852, and 853 may be provided so as to deviate from the imaginary line α2.

As illustrated in FIG. 7, in the group of terminals 831, 832, and 833 coupled to the sensor element 3, when a region Q3 in which the terminal 831 that is an input terminal is extended in the X-axis direction is set, at least a part of each of the terminals 832 and 833 is positioned in the region Q3. In other words, the terminals 832 and 833 partially overlap the terminal 831 when viewed from the X-axis direction. With this configuration, the terminals 832 and 833 can be disposed closer to each other without causing short-circuiting with the wiring 731, and a disposition space of the group of terminals 831, 832, and 833 can be further reduced. The wiring 731 coupled to the terminal 831 extends linearly in the X-axis direction within the region Q3 and is provided between the terminals 832 and 833, in the exposed portion 29. With this configuration, the space between the terminal 832 (first detection terminal) and the terminal 833 (second detection terminal) can be effectively used, and the inertial sensor 1 can be reduced in size.

In the group of terminals 841, 842, and 843 coupled to the sensor element 4, when a region Q4 in which the terminal 841, that is an input terminal, is extended in the X-axis direction is set, at least a part of each of the terminals 842 and 843 is positioned in the region Q4. In other words, the terminals 842 and 843 partially overlap the terminal 841 when viewed from the X-axis direction. With this configuration, the terminals 842 and 843 can be disposed closer to each other without causing short-circuiting with the wiring 741, and a disposition space of the group of terminals 841, 842, and 843 can be further reduced. The wiring 741 coupled to the terminal 841 extends linearly in the X-axis direction within the region Q4 and is provided between the terminals 842 and 843, in the exposed portion 29. With this configuration, the space between the terminal 842 (first detection terminal) and the terminal 843 (second detection terminal) can be effectively used, and the inertial sensor 1 can be reduced in size.

In the group of terminals 851, 852, and 853 coupled to the sensor element 5, when a region Q5 in which the terminal 851, that is an input terminal, is extended in the X-axis direction is set, at least a part of each of the terminals 852 and 853 is positioned in the region Q5. In other words, the terminals 852 and 853 partially overlap the terminal 851 when viewed from the X-axis direction. With this configuration, the terminals 852 and 853 can be disposed closer to each other without causing short-circuiting with the wiring 751, and a disposition space of the group of terminals 851, 852, and 853 can be further reduced. The wiring 751 coupled to the terminal 851 extends linearly in the X-axis direction within the region Q5 and is provided between the terminals 852 and 853, in the exposed portion 29. With this configuration, the space between the terminal 852 (first detection terminal) and the terminal 853 (second detection terminal) can be effectively used, and the inertial sensor 1 can be reduced in size.

In the group of wirings 731, 732, and 733 coupled to the sensor element 3, the wirings 732 and 733 for the detection signals have the same length. In particular, as illustrated in FIG. 7, when an imaginary line β3 extending in the X-axis direction through a center β3 of the terminal 831 is set, the wirings 732 and 733 are provided symmetrically with respect to the imaginary line β3. With such a disposition, parasitic capacitances and parasitic resistances of the wirings 732 and 733 are equal to each other, and these parasitic capacitances and parasitic resistances can be effectively canceled by a differential operation. For that reason, the inertial sensor 1 can measure the acceleration Ax with higher accuracy.

The fact that the wirings 732 and 733 have the same length means that a case where the lengths of the wirings 732 and 733 have an error that may occur in manufacturing, for example, an error within ±5% is included, in addition to a case where the lengths of the wirings 732 and 733 coincide with each other. The configuration of the wirings 732 and 733 is not limited thereto, and the wirings 732 and 733 may have different lengths, for example. For example, a part of the wirings 732 and 733 may be provided symmetrically with respect to the imaginary line β3, or the entire regions of the wirings 732 and 733 may be provided asymmetrically. The same applies to the group of wirings 741, 742, and 743 and the group of wirings 751, 752, and 753 described below.

In the group of the wirings 741, 742, and 743 coupled to the sensor element 4, the detection signal wirings 742 and 743 have the same length. In particular, when an imaginary line β4 extending in the X-axis direction through a center O4 of the terminal 841 is set, the wirings 742 and 743 are provided symmetrically with respect to the imaginary line β4. With such a disposition, parasitic capacitances and parasitic resistances of the wirings 742 and 743 are equal to each other, and these parasitic capacitances and parasitic resistances can be effectively canceled by the differential operation. For that reason, the inertial sensor 1 can measure the acceleration Ay with higher accuracy.

In the group of the wirings 751, 752, and 753 coupled to the sensor element 5, the detection signal wirings 752 and 753 have the same length. In particular, when an imaginary line β5 extending in the X-axis direction through a center O5 of the terminal 851 is set, the wirings 752 and 753 are provided symmetrically with respect to the imaginary line β5. With such a disposition, parasitic capacitances and parasitic resistances of the wirings 752 and 753 are equal to each other, and these parasitic capacitances and parasitic resistances can be effectively canceled by the differential operation. For that reason, the inertial sensor 1 can measure the acceleration Az with higher accuracy.

The inertia sensor 1 has been described as above. As described above, such an inertial sensor 1 includes the substrate 2, the sensor elements 3, 4, and 5 provided on the substrate 2, the lid 6 that covers the sensor elements 3, 4, and 5 and is bonded to the substrate 2, a plurality of terminals 831, 832, and 833 that are positioned outside the lid 6 and electrically coupled to the sensor element 3, a plurality of terminals 841, 842, and 843 electrically coupled to the sensor element 4, and a plurality of terminals 851, 852, and 853 electrically coupled to the sensor element 5. The plurality of terminals 831, 832, and 833 include the terminal 831 as an input terminal to which the drive voltage Vx that is an electric signal is input and the terminals 832 and 833 as detection terminals for detecting charges from the sensor element 3, and when the distance between the terminal 831 and the lid 6 is L1 and the distance between the terminals 832 and 833 and the lid 6 is L2, the relationship of L1>L2 is satisfied. The plurality of terminals 841, 842, and 843 include the terminal 841 as an input terminal to which the drive voltage Vy that is an electric signal is input and the terminals 842 and 843 as detection terminals for detecting charges from the sensor element 4, and when the distance between the terminal 841 and the lid 6 is L1 and the distance between the terminals 842 and 843 and the lid 6 is L2, the relationship of L1>L2 is satisfied. The plurality of terminals 851, 852, and 853 include the terminal 851 as an input terminal to which the drive voltage Vz that is an electric signal is input and the terminals 852 and 853 as detection terminals for detecting charges from the sensor element 5, and when the distance between the terminal 851 and the lid 6 is L1 and the distance between the terminals 852 and 853 and the lid 6 is L2, the relationship of L1>L2 is satisfied.

By satisfying such a relationship, the lengths of the wirings 732, 733, 742, 743, 752, and 753 for detection can be further shortened, and the detection signal is hardly affected by disturbance. For that reason, noise is less likely to be mixed into the detection signal, and the accelerations Ax, Ay, and Az can be detected with higher accuracy. In particular, the detected charge amount is a weak charge amount with respect to the drive voltages Vx, Vy, and Vz, and the configuration described above in which the amount of charge that can be extracted decreases when the parasitic capacitance is large becomes more effective. Since the row of plurality of terminals 831, 832, 833, 841, 842, 843, 851, 852, and 853 can be disposed by being divided into the group of terminals 831, 841, and 851 that are input terminals and the group of terminals 832, 833, 842, 843, 852, and 853 that are detection terminals, the plurality of terminals 831, 832, 833, 841, 842, 843, 851, 852, and 853 can be efficiently disposed in a smaller space. For that reason, the inertial sensor 1 can be reduced in size.

As described above, the inertial sensor 1 includes the wiring 731 as an input wiring that electrically couples the terminal 831 and the sensor element 3, the detection terminals includes the terminal 832 as the first detection terminal and the terminal 833 as the second detection terminal, and the wiring 731 is provided between the terminal 832 and the terminal 833. The inertial sensor 1 includes the wiring 741 as an input wiring that electrically couples the terminal 841 and the sensor element 4, the detection terminals includes the terminal 842 as the first detection terminal and the terminal 843 as the second detection terminal, and the wiring 741 is provided between the terminal 842 and the terminal 843. The inertial sensor 1 includes the wiring 751 as an input wiring that electrically couples the terminal 851 and the sensor element 5, the detection terminals includes the terminal 852 as the first detection terminal and the terminal 853 as the second detection terminal, and the wiring 751 is provided between the terminal 852 and the terminal 853. With this configuration, the space between the terminals 832 and 833, the space between the terminals 842 and 843, and the space between the terminals 852 and 853 can be effectively utilized, and the inertial sensor 1 can be reduced in size.

As described above, the plurality of terminals 831, 832, 833, 841, 842, 843, 851, 852, and 853 are respectively positioned at one side in the first direction with respect to the lid 6, in the first embodiment, on the minus side in the X-axis direction. With this configuration, the plurality of terminals 831, 832, 833, 841, 842, 843, 851, 852, and 853 can be collectively disposed in one region, so that the inertial sensor 1 can be reduced in size.

As described above, the terminal 832 and the terminal 833 are provided so as to at least partially overlap the region Q3 in which the terminal 831 is extended in the X-axis direction. With this configuration, the terminals 832 and 833 can be disposed closer to each other, and the disposition space of the group of terminals 831, 832, and 833 can be further reduced.

The terminal 842 and the terminal 843 are provided so as to at least partially overlap the region Q4 in which the terminal 841 is extended in the X-axis direction. With this configuration, the terminals 842 and 843 can be arranged closer to each other, and the disposition space of the group of the terminals 841, 842, and 843 can be further reduced.

The terminal 852 and the terminal 853 are provided so as to at least partially overlap the region Q5 in which the terminal 851 is extended in the X-axis direction. With this configuration, the terminals 852 and 853 can be arranged closer to each other, and the disposition space of the group of the terminals 851, 852 and 853 can be further reduced.

As described above, the inertial sensor 1 includes the wiring 732 as the first detection wiring that electrically couples the terminal 832 and the sensor element 3, and the wiring 733 as the second detection wiring that electrically couples the terminal 833 and the sensor element 3. The wiring 732 and the wiring 733 have the same length. With this configuration, parasitic capacitance and parasitic resistance of the wirings 732 and 733 are equal to each other, and these parasitic capacitance and parasitic resistance can be effectively canceled by a differential operation. For that reason, the inertial sensor 1 can measure the acceleration Ax with higher accuracy.

As described above, the inertial sensor 1 includes the wiring 742 as the first detection wiring that electrically couples the terminal 842 and the sensor element 4, and the wiring 743 as the second detection wiring that electrically couples the terminal 843 and the sensor element 4. The wiring 742 and the wiring 743 have the same length. With this configuration, parasitic capacitance and parasitic resistance of the wirings 742 and 743 are equal to each other, and these parasitic capacitance and parasitic resistance can be effectively canceled by a differential operation. For that reason, the inertial sensor 1 can measure the acceleration Ay with higher accuracy.

As described above, the inertial sensor 1 includes the wiring 752 as the first detection wiring that electrically couples the terminal 852 and the sensor element 5, and the wiring 753 as the second detection wiring that electrically couples the terminal 853 and the sensor element 5. The wiring 752 and the wiring 753 have the same length. With this configuration, parasitic capacitance and parasitic resistance of the wirings 752 and 753 are equal to each other, and these parasitic capacitance and parasitic resistance can be effectively canceled by a differential operation. For that reason, the inertial sensor 1 can measure the acceleration Az with higher accuracy.

As described above, the plurality of terminals 831, 832, 833, 841, 842, 843, 851, 852, and 853 are provided on the substrate 2. With this configuration, these terminals 831, 832, 833, 841, 842, 843, 851, 852, and 853 can be easily formed.

Second Embodiment

Figure 8:
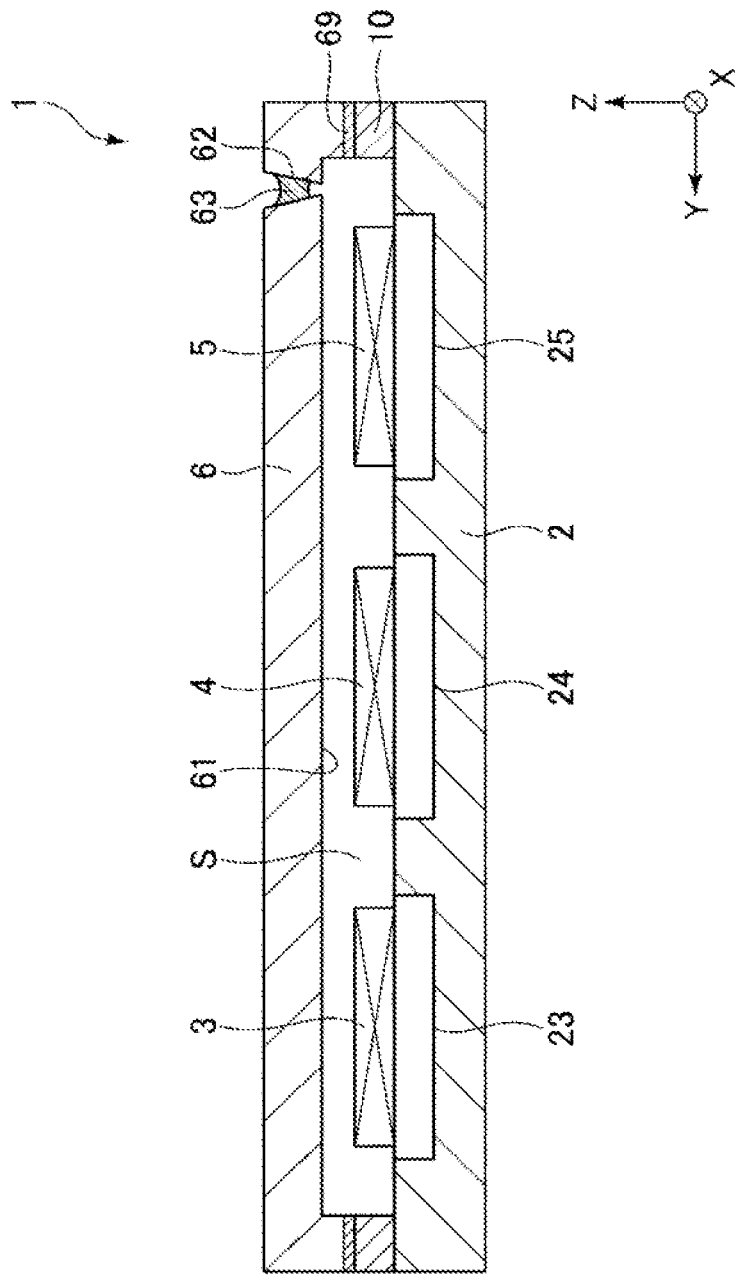
FIG. 8 is a cross-sectional view illustrating an inertial sensor according to a second embodiment.
Figure 9:
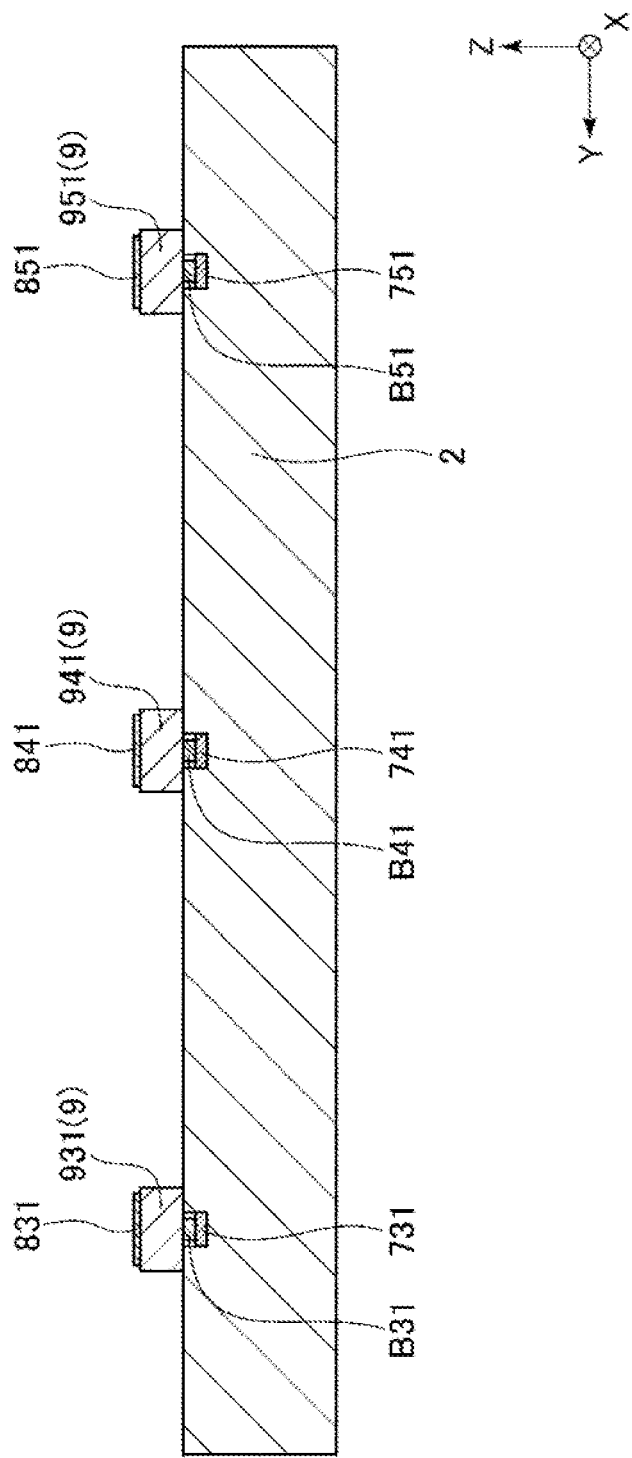
FIG. 9 is a cross-sectional view illustrating a mounting table provided on a substrate.
Figure 10:
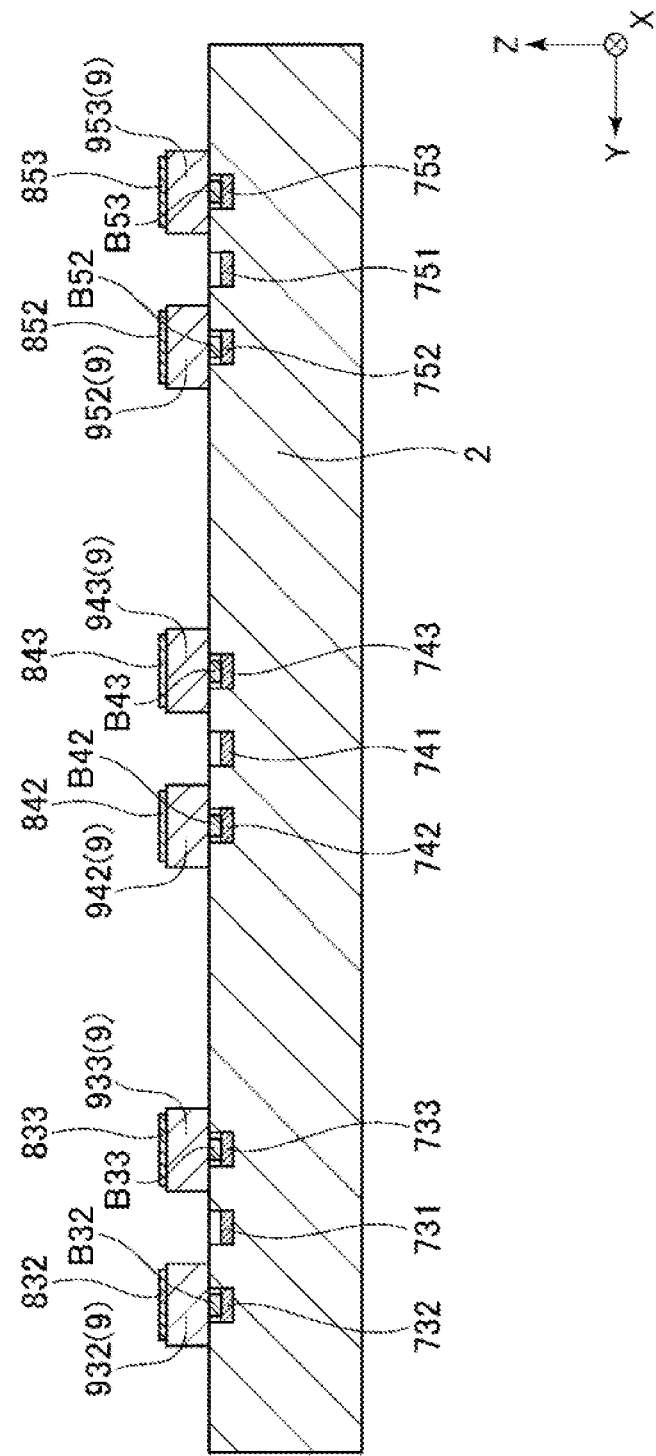
FIG. 10 is a cross-sectional view illustrating another mounting table provided on the substrate.

FIG. 8 is a cross-sectional view illustrating an inertial sensor of the second embodiment. FIGS. 9 and 10 are cross-sectional views illustrating a mounting table provided on the substrate. FIG. 9 is a cross-sectional view taken along an imaginary line α1 in FIG. 7, and FIG. 10 is a cross-sectional view taken along an imaginary line α2 in FIG. 7.

The second embodiment is the same as the first embodiment described above except that the bonding method of the substrate 2 and the lid 6 and the disposition of the terminals 831, 832, 833, 841, 842, 843, 851, 852, and 853 are different. In the following description, the second embodiment will be described with a focus on differences from the first embodiment described above, and description of similar matters will be omitted. In FIGS. 8 to 10, the same reference numerals are given to the same configurations as those in the first embodiment described above.

As illustrated in FIG. 8, the inertial sensor 1 includes an intermediate member 10 provided between the substrate 2 and the lid 6. The intermediate member 10 has a frame shape surrounding the sensor elements 3, 4, and 5 in plan view from the Z-axis direction. As illustrated in FIGS. 9 and 10, the inertial sensor 1 includes a mounting table 9 provided on the exposed portion 29 of the substrate 2. The intermediate member 10 and the mounting table 9 are made of the same material as the sensor elements 3, 4, and 5, respectively. For that reason, the intermediate member 10 and the mounting table 9 can be collectively formed with the sensor elements 3, 4, and 5. Specifically, the intermediate member 10 and the mounting table 9 can be collectively formed with the sensor elements 3, 4, and 5 by patterning a conductive silicon substrate that is anodically bonded to the substrate 2 by a Bosch process. For that reason, the inertial sensor 1 can be easily manufactured.

As illustrated in FIGS. 9 and 10, the mounting table 9 includes a mounting table 931 that is electrically coupled to the wiring 731 through a bump B31, a mounting table 932 that is electrically coupled to the wiring 732 through a bump B32, a mounting table 933 that is electrically coupled to the wiring 733 through a bump B33, a mounting table 941 that is electrically coupled to the wiring 741 through a bump B41, a mounting table 942 that is electrically coupled to the wiring 742 through a bump B42, a mounting table 943 that is electrically coupled to the wiring 743 through a bump B43, a mounting table 951 that is electrically coupled to the wiring 751 through a bump B51, a mounting table 952 that is electrically coupled to the wiring 752 through a bump B52, and a mounting table 953 that is electrically coupled to the wiring 753 through a bump B53.

Then, the terminal 831 is provided on the top surface of the mounting table 931, the terminal 832 is provided on the top surface of the mounting table 932, the terminal 833 is provided on the top surface of the mounting table 933, the terminal 841 is provided on the top surface of the mounting table 941, the terminal 842 is provided on the top surface of the mounting table 942, the terminal 843 is provided on the top surface of the mounting table 943, the terminal 851 is provided on the top surface of the mounting table 951, the terminal 852 is provided on the top surface of the mounting table 952, and the terminal 853 is provided on the top surface of the mounting table 953. For that reason, the terminal 831 is electrically coupled to the wiring 731 through the mounting table 931, the terminal 832 is electrically coupled to the wiring 732 through the mounting table 932, the terminal 833 is electrically coupled to the wiring 733 through the mounting table 933, the terminal 841 is electrically coupled to the wiring 741 through the mounting table 941, the terminal 842 is electrically coupled to the wiring 742 through the mounting table 942, the terminal 843 is electrically coupled to the wiring 743 through the mounting table 943, the terminal 851 is electrically coupled to the wiring 751 through the mounting table 951, the terminal 852 is electrically coupled to the wiring 752 through the mounting table 952, and the terminal 853 is electrically coupled to the wiring 753 through the mounting table 953.

As such, by disposing the terminals 831, 832, 833, 841, 842, 843, 851, 852, and 853 on the mounting table 931, 932, 933, 941, 942, 943, 951, 952, and 953, the terminals 831, 832, 833, 841, 842, 843, 851, 852, and 853 can be disposed at positions protruding upward from the substrate 2. For that reason, for example, bonding wires can be easily coupled to the terminals 831, 832, 833, 841, 842, 843, 851, 852, and 853, and electrical connection between the inertial sensor 1 and an external device can be easily performed.

As illustrated in FIG. 8, a bonding member 69 is provided on the top surface of the intermediate member 10, and the intermediate member 10 and the lid 6 are bonded by the bonding member 69. In particular, in the second embodiment, the bonding member 69 is made of a metal material, and the bonding member 69 and the lid 6 are bonded by being thermocompression-bonded with each other. However, the bonding method of the bonding member 69 or the intermediate member 10 and the lid 6 is not particularly limited.

In the second embodiment, the terminals 831, 832, 833, 841, 842, 843, 851, 852, and 853 and the bonding member 69 are made of the same material. With this configuration, the terminals 831, 832, 833, 841, 842, 843, 851, 852, and 853 and the bonding member 69 can be collectively formed, and the terminals 831, 832, 833, 841, 842, 843, 851, 852, and 853 and the bonding member 69 can be easily formed. Specifically, by depositing a metal film on the upper surface of the conductive silicon substrate that is a base material of the sensor elements 3, 4, and 5, the intermediate member 10, and the mounting table 9, and patterning this metal film, the terminals 831, 832, 833, 841, 842, 843, 851, 852, and 853 and the bonding member 69 can be collectively formed.

The constituent materials of the terminals 831, 832, 833, 841, 842, 843, 851, 852, and 853 and the bonding member 69 are not particularly limited, but, for example, an aluminum (Al)/germanium (Ge)-based alloy can be used. Since this material is excellent in adhesiveness, airtightness of the accommodation space S can be more reliably ensured.

As described above, in the inertial sensor 1 of the second embodiment, the plurality of terminals 831, 832, 833, 841, 842, 843, 851, 852, and 853 are provided on the substrate 2 and provided on the mounting table 9 made of the same material as the sensor elements 3, 4, and 5. With this configuration, the terminals 831, 832, 833, 841, 842, 843, 851, 852, and 853 can be disposed at positions protruding upward from the substrate 2. For that reason, for example, the bonding wires can be easily coupled to the terminals 831, 832, 833, 841, 842, 843, 851, 852, and 853, and the inertial sensor 1 and the external device can be easily electrically coupled. By configuring the mounting table 9 with the same material as the sensor elements 3, 4, and 5, the mounting table 9 can be formed together with the sensor elements 3, 4, and 5, and thus the inertial sensor 1 can be easily manufactured.

As described above, the inertial sensor 1 includes the bonding member 69 that is provided between the substrate 2 and the lid 6 and bonds the substrate 2 and the lid 6. The bonding member 69 contains the same material as the plurality of terminals 831, 832, 833, 841, 842, 843, 851, 852, and 853. With this configuration, the bonding member 69 and the terminals 831, 832, 833, 841, 842, 843, 851, 852, and 853 can be collectively formed, and thus the inertial sensor 1 can be easily manufactured.

According to the second embodiment as described above, the same effects as those of the first embodiment described above can be exhibited.

Third Embodiment

Figure 11:
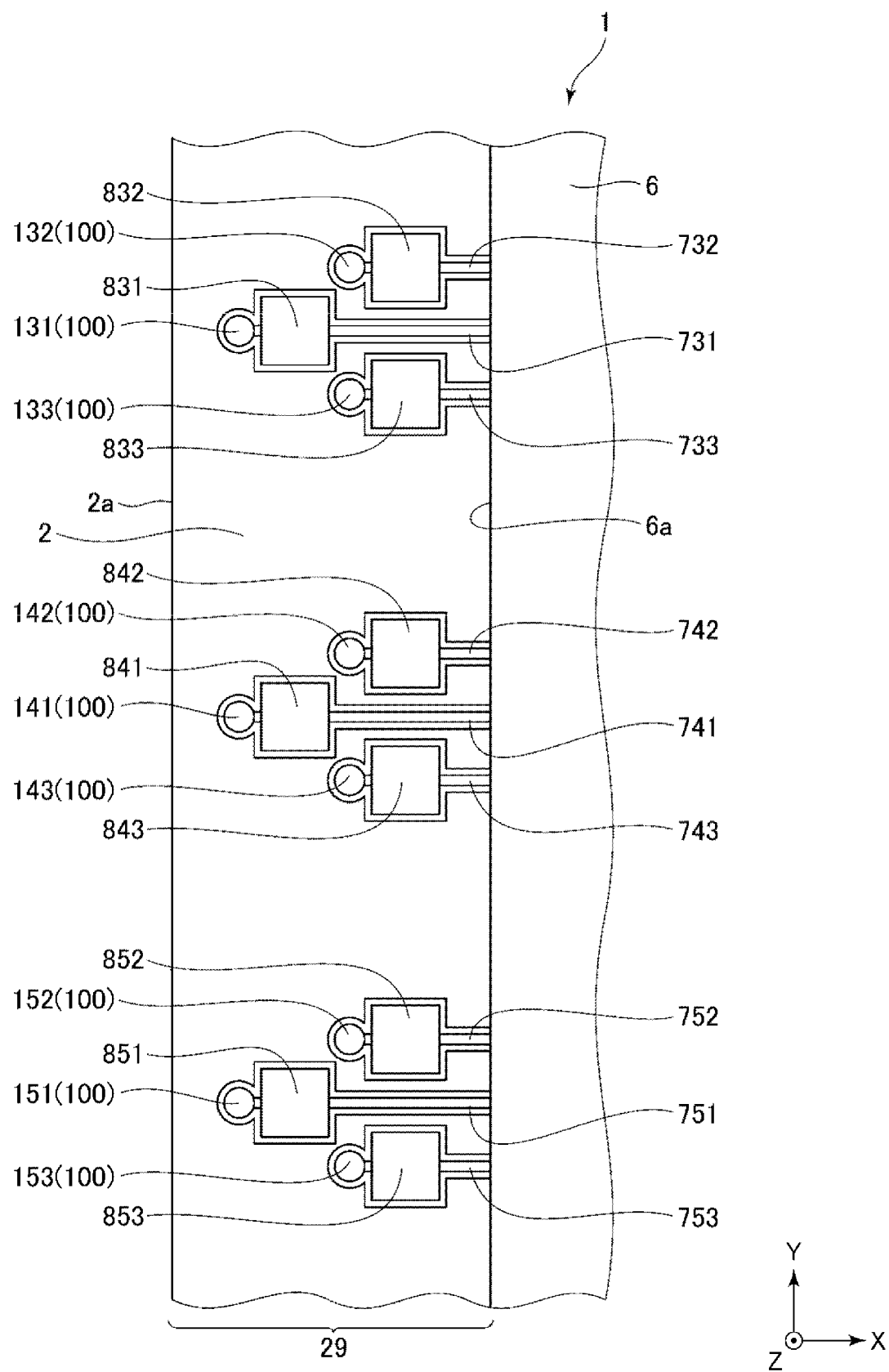
FIG. 11 is a partially enlarged plan view illustrating an inertial sensor according to a third embodiment.

FIG. 11 is a partially enlarged plan view illustrating an inertial sensor of a third embodiment.

The third embodiment is the same as the first embodiment described above except that an inspection terminal 100 electrically coupled to the terminals 831, 832, 833, 841, 842, 843, 851, 852, and 853 is included. In the following description, the third embodiment will be described with a focus on differences from the first and second embodiments, and description of similar matters will be omitted. In FIG. 11, the same reference numerals are given to the same configurations as those in the first and second embodiments described above.

As illustrated in FIG. 11, the inertial sensor 1 includes an inspection terminal 100 provided on the exposed portion 29 of the substrate 2 and is electrically coupled to the terminals 831, 832, 833, 841, 842, 843, 851, 852, and 853.

The inspection terminal 100 includes an inspection terminal 131 that is provided side by side with the terminal 831 and is electrically coupled to the terminal 831, an inspection terminal 132 that is provided side by side with the terminal 832 and is electrically coupled to the terminal 832, an inspection terminal 133 that is provided side by side with the terminal 833 and is electrically coupled to the terminal 833, an inspection terminal 141 that is provided side by side with the terminal 841 and is electrically coupled to the terminal 841, an inspection terminal 142 that is provided side by side with the terminal 842 and is electrically coupled to the terminal 842, an inspection terminal 143 that is provided side by side with the terminal 843 and is electrically coupled to the terminal 843, an inspection terminal 151 that is provided side by side with the terminal 851 and is electrically coupled to the terminal 851, an inspection terminal 152 that is provided side by side with the terminal 852 and is electrically coupled to the terminal 852, and an inspection terminal 153 that is provided side by side with the terminal 853 and is electrically coupled to the terminal 853.

By providing such inspection terminals 131, 132, 133, 141, 142, 143, 151, 152, and 153, for example, the inertial sensor 1 can be inspected by pressing an inspection probe against the inspection terminals 131, 132, 133, 141, 142, 143, 151, 152, and 153, and thus the terminals 831, 832, 833, 841, 842, 843, 851, 852, and 853 are not damaged during inspection. For that reason, the bonding wire and each terminal can be coupled well, and the inertial sensor 1 with high reliability is obtained.

In the third embodiment, the inspection terminals 131, 132, 133, 141, 142, 143, 151, 152, and 153 have a shape in plan view different from that of the terminals 831, 832, 833, 841, 842, 843, 851, 852, and 853, respectively. Each of the inspection terminals 131, 132, 133, 141, 142, 143, 151, 152, and 153 has a circular shape in plan view, and the shape in plan view is a rotation target. As such, by making the shape of the inspection terminals 131, 132, 133, 141, 142, 143, 151, 152, and 153 in plan view different from that of the terminals 831, 832, 833, 841, 842, 843, 851, 852, and 853 and setting the shape of the inspection terminals 131, 132, 133, 141, 142, 143, 151, 152, and 153 in plan view as the rotation target, the inspection terminals 131, 132, 133, 141, 142, 143, 151, 152, and 153 can be easily recognized by an image recognition technique when the inertial sensor 1 is inspected, for example.

However, the shape of the inspection terminals 131, 132, 133, 141, 142, 143, 151, 152, and 153 is not particularly limited, and the shape of the inspection terminals 131, 132, 133, 141, 142, 143, 151, 152, and 153 may be the same shape as the terminal 831, 832, 833, 841, 842, 843, 851, 852, and 853 or may be a shape other than the shape of rotation target.

As described above, the inertial sensor 1 of the third embodiment includes a plurality of inspection terminals 131, 132, 133, 141, 142, 143, 151, 152, and 153 that are coupled to the plurality of terminals 831, 832, 833, 841, 842, 843, 851, 852, and 853 and have a shape in plan view different from that of the plurality of terminals 831, 832, 833, 841, 842, 843, 851, 852, and 853. With this configuration, the inspection of the inertial sensor 1 can be performed using the inspection terminals 131, 132, 133, 141, 142, 143, 151, 152, and 153, and thus the terminals 831, 832, 833, 841, 842, 843, 851, 852, and 853 will not be damaged during inspection. For that reason, the inertial sensor 1 with high reliability is obtained. Also, by making the shapes of the inspection terminals and terminals different from each other, the inspection terminals 131, 132, 133, 141, 142, 143, 151, 152, and 153 and the terminals 831, 832, 833, 841, 842, 843, 851, 852, and 853 can be easily identified.

As described above, the shapes of the plurality of inspection terminals 131, 132, 133, 141, 142, 143, 151, 152, and 153 in plan view are rotation targets. With this configuration, the inspection terminals 131, 132, 133, 141, 142, 143, 151, 152, and 153 can be easily recognized, and the inertial sensor 1 can be inspected more smoothly.

According to the third embodiment as described above, the same effects as those of the first embodiment described above can be exhibited.

Fourth Embodiment

Figure 12:
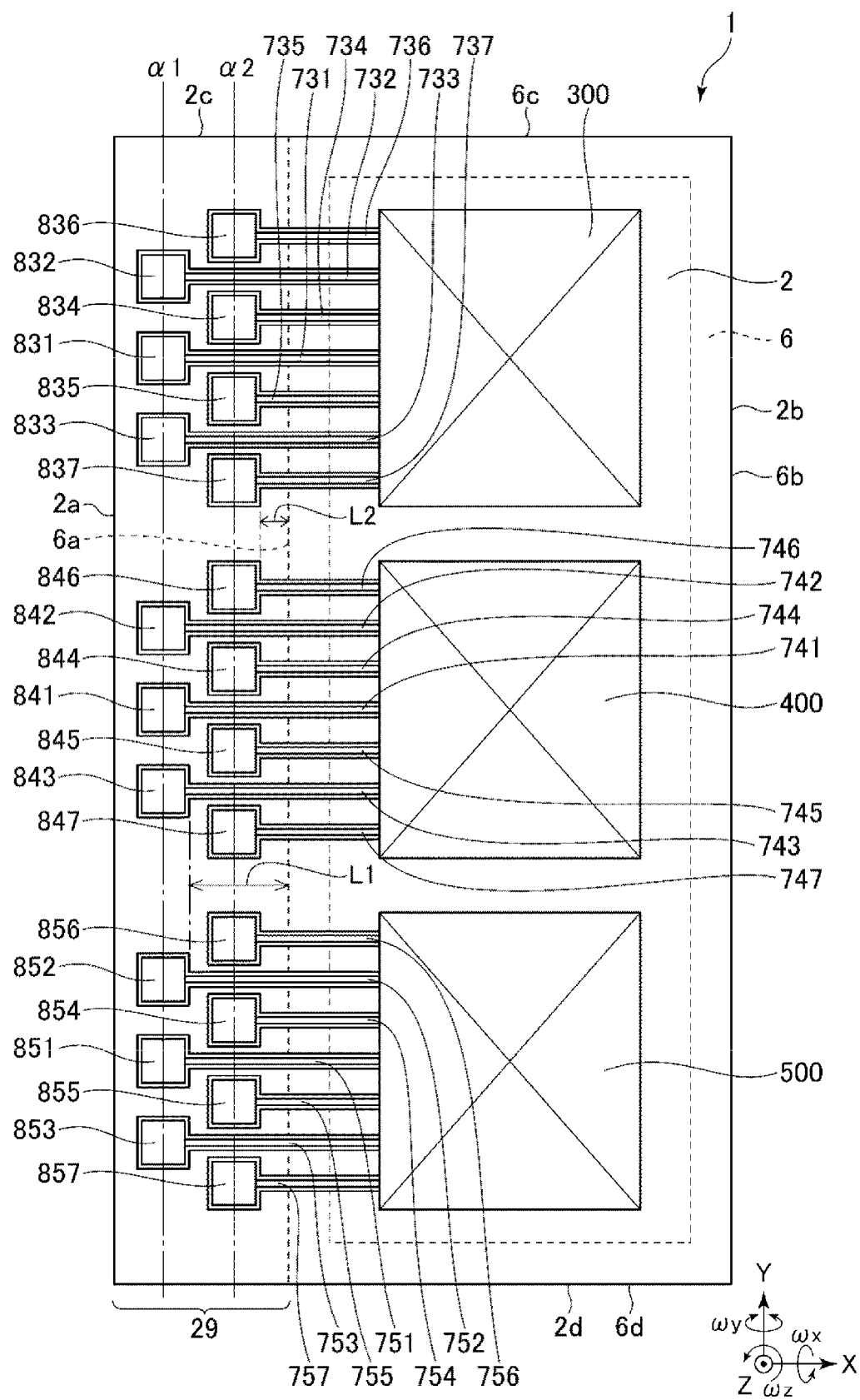
FIG. 12 is a plan view illustrating an inertial sensor according to a fourth embodiment.
Figure 13:
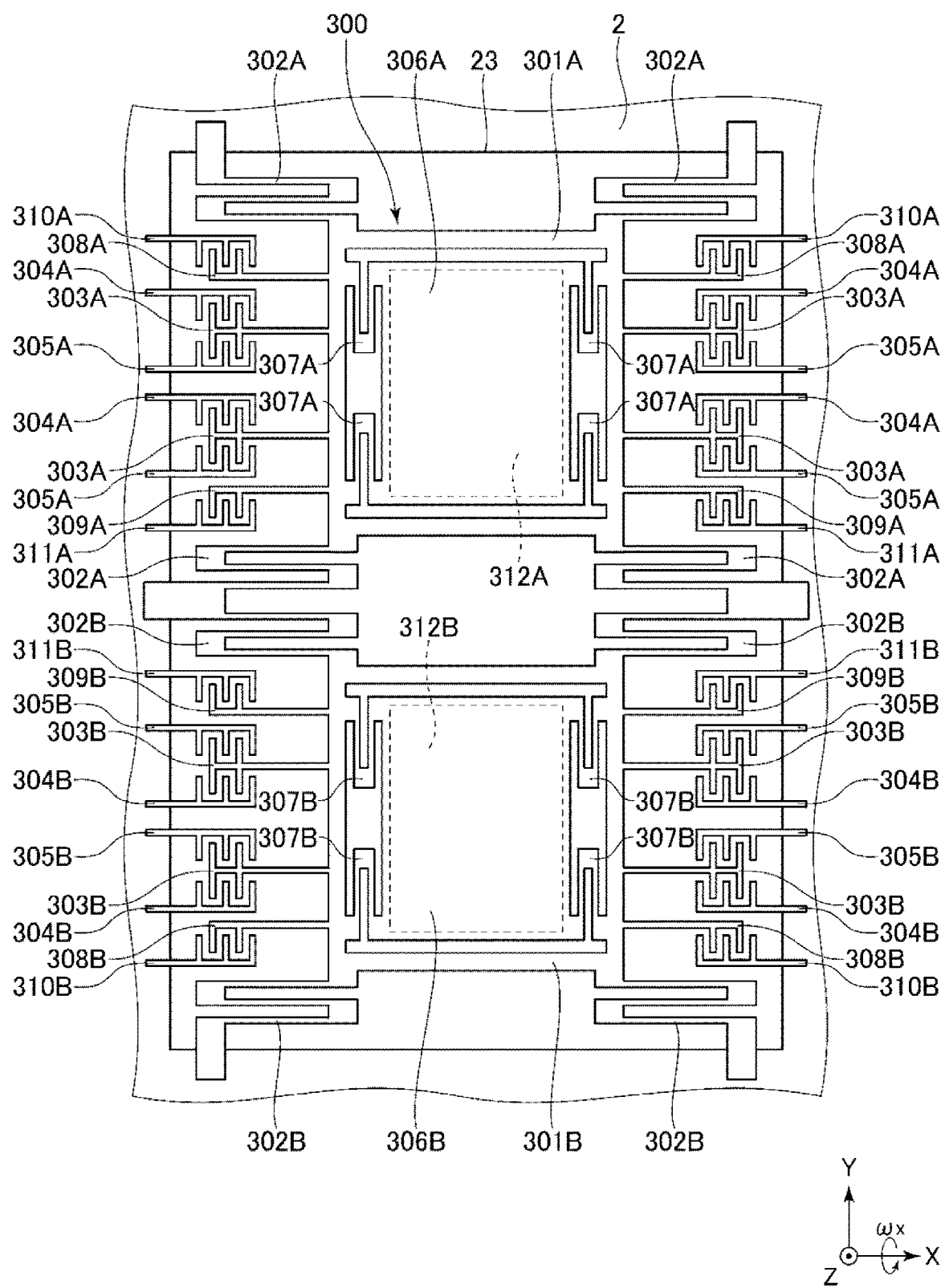
FIG. 13 is a plan view illustrating an example of a sensor element that measures an angular velocity around the X-axis.
Figure 14:
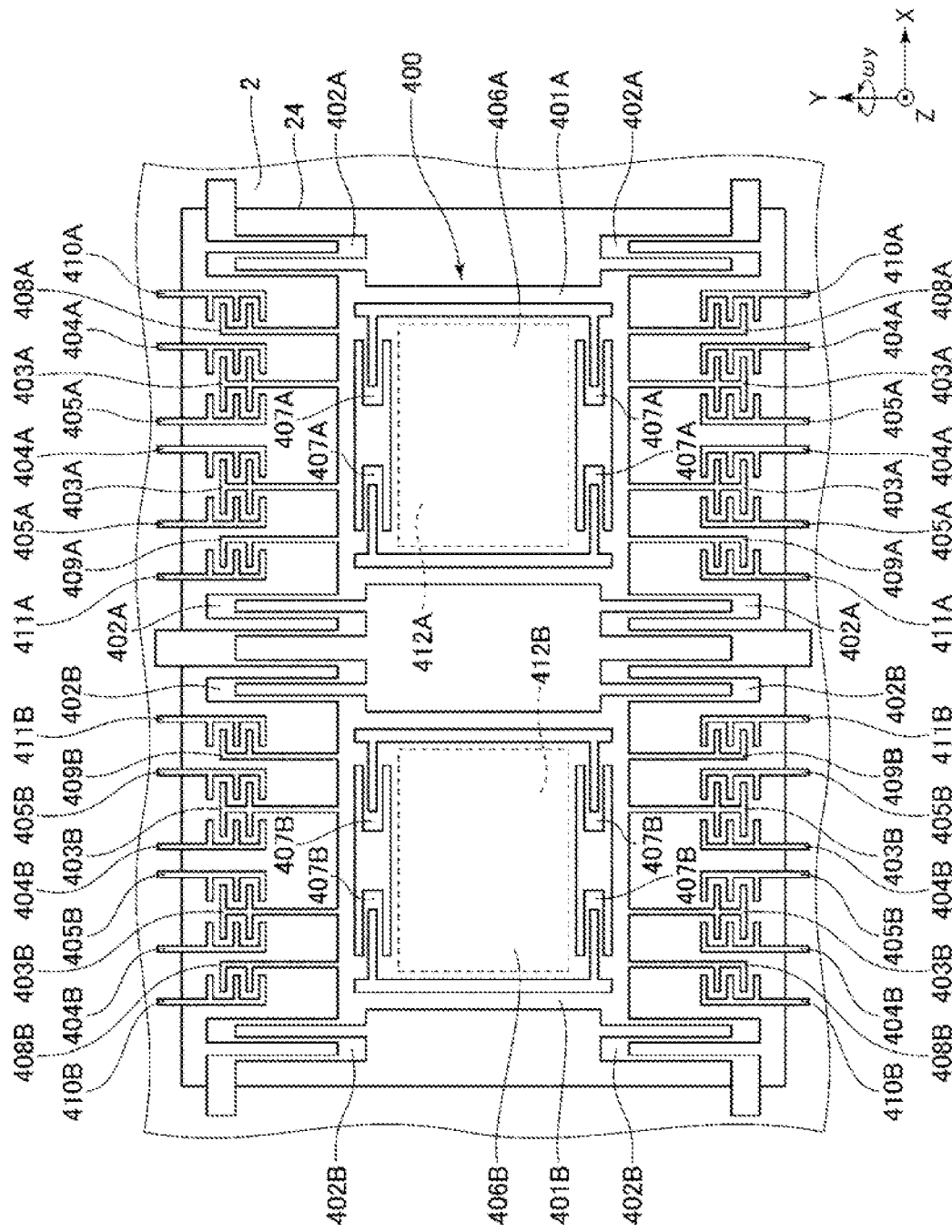
FIG. 14 is a plan view illustrating an example of a sensor element that measures an angular velocity around the Y-axis.
Figure 15:
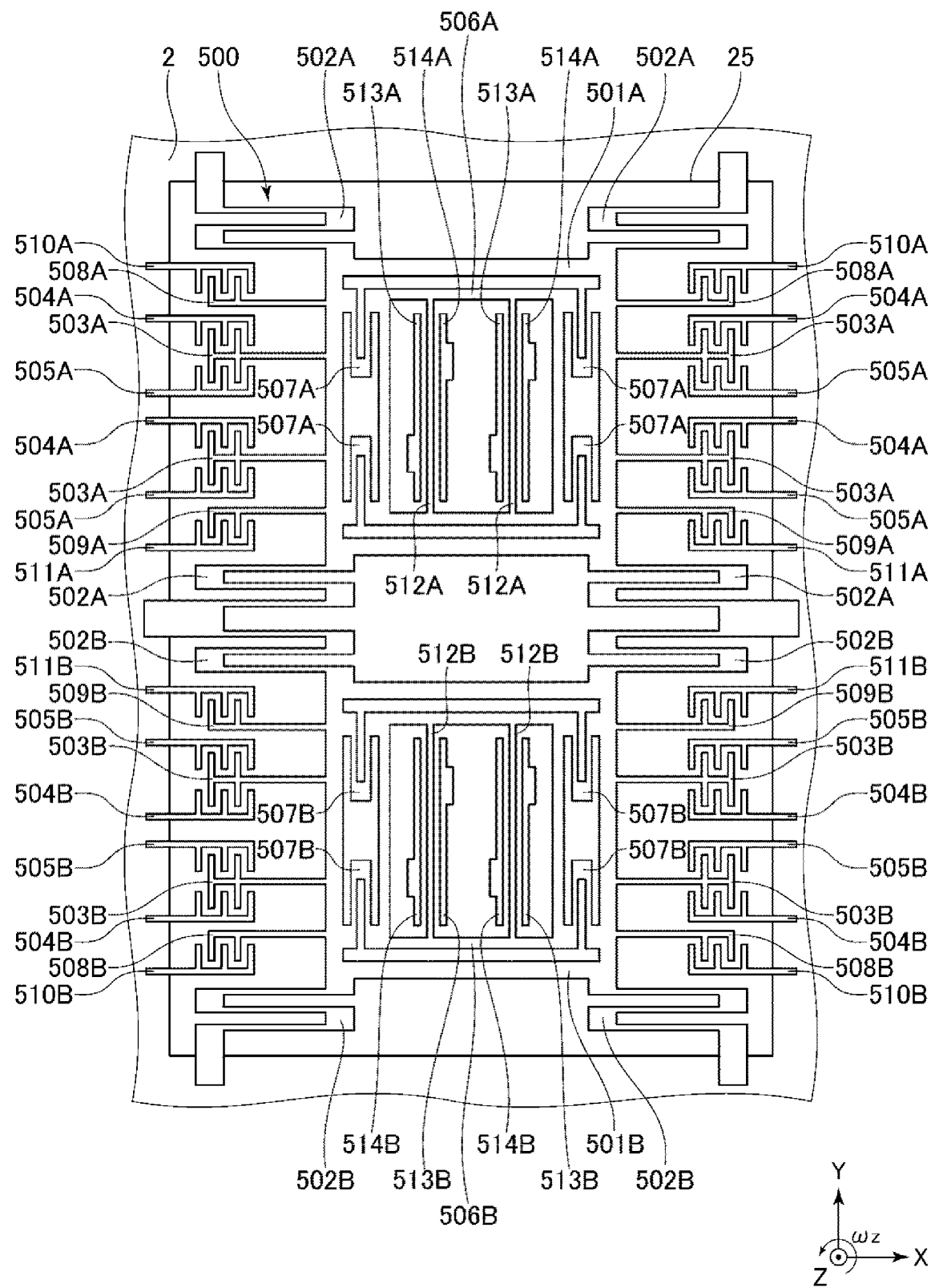
FIG. 15 is a plan view illustrating an example of a sensor element that measures an angular velocity around the Z-axis.
Figure 16:
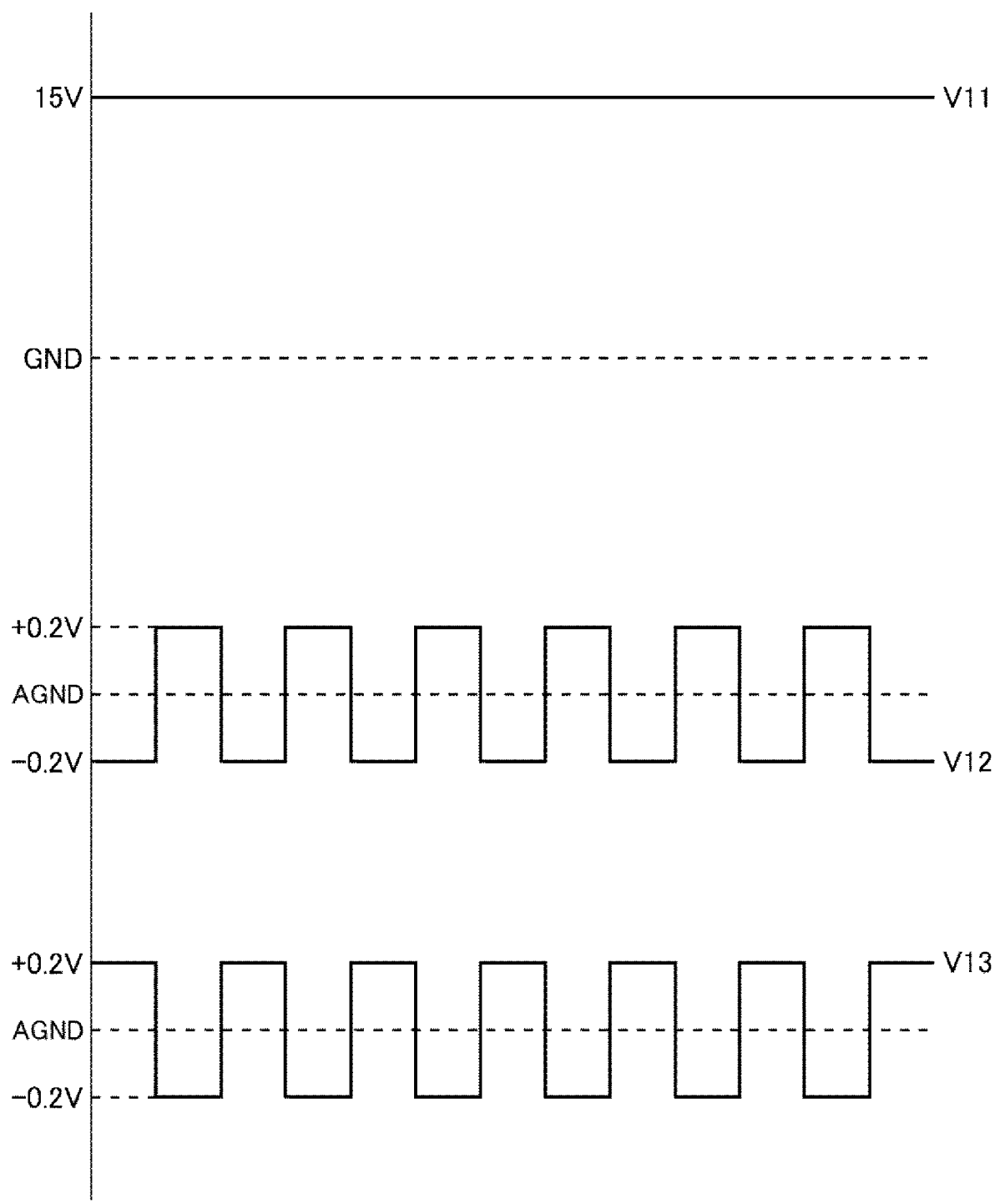
FIG. 16 is a graph illustrating a voltage applied to the sensor element.

FIG. 12 is a plan view illustrating an inertial sensor of the fourth embodiment. FIG. 13 is a plan view illustrating an example of a sensor element that measures an angular velocity around the X-axis. FIG. 14 is a plan view illustrating an example of a sensor element that measures an angular velocity around the Y-axis. FIG. 15 is a plan view illustrating an example of a sensor element that measures an angular velocity around the Z-axis. FIG. 16 is a graph illustrating a voltage applied to the sensor element.

The fourth embodiment is the same as the first embodiment described above except that sensor elements 300, 400, and 500 are used instead of the sensor elements 3, 4, and 5. In the following description, the fourth embodiment will be described with a focus on differences from the first to third embodiments described above, and description of similar matters will be omitted. In FIGS. 12 to 16, the same reference numerals are given to the same configurations as those in the first to third embodiments described above.

The inertial sensor 1 illustrated in FIG. 12 is an angular velocity sensor that can independently measure angular velocities around the X-, Y-, and Z-axes that are orthogonal to each other. Such an inertial sensor 1 includes the substrate 2, three sensor elements 300, 400, and 500 provided on the substrate 2, and the lid 6 that accommodates the sensor elements 300, 400, and 500 and is bonded to the substrate 2. Of the three sensor elements 300, 400, and 500, the sensor element 300 measures an angular velocity $\omega x$ around the X-axis, the sensor element 400 measures an angular velocity coy around the Y-axis, and the sensor element 500 measures an angular velocity ωz around the Z-axis. In FIG. 12, for convenience of explanation, the sensor elements 300, 400, and 500 are illustrated in a simplified manner.

The accommodation space S formed by the substrate 2 and the lid 6 may be in a decompressed state. By setting the accommodation space S in a decompressed state, viscous resistance is reduced and the sensor elements 300, 400, 500 can be vibrated effectively. For that reason, detection accuracy of the inertial sensor 1 is improved.

The substrate 2 has a groove which opens to the upper surface thereof, and a plurality of wirings 731, 732, 733, 734, 735, 736, 737, 741, 742, 743, 744, 745, 746 747, 751, 752, 753, 754, 755, 756, and 757 and terminals 831, 832, 833, 834, 835, 836, 837, 841, 842, 843, 844, 845, 846, 847, 851, 852, 853, 854, 855, 856, and 857 are provided in the groove. The wirings 731 to 737, 741 to 747, and 751 to 757 are provided inside and outside the accommodation space S, and among these wirings, the wirings 731 to 737 are electrically coupled to the sensor element 300, the wirings 741 to 747 are electrically coupled to the sensor element 400, and the wirings 751 to 757 are electrically coupled to the sensor element 500. The terminals 831 to 837, 841 to 847, and 851 to 857 are provided on the exposed portion 29, that is, outside the lid 6, respectively. The terminals 831 to 837 are electrically coupled to the wirings 731 to 737, the terminals 841 to 847 are electrically coupled to the wirings 741 to 747, and the terminals 851 to 857 are electrically coupled to the wirings 751 to 757.

Similar to the sensor elements 3, 4, and 5 of the first embodiment described above, the sensor elements 300, 400, and 500 can be collectively formed by anodically bonding a silicon substrate doped with impurities such as phosphorus (P), boron (B), and arsenic (As) to the upper surface of the substrate 2 and patterning the silicon substrate by a Bosch process that is a deep groove etching technique. However, the method of forming the sensor elements 300, 400, 500 is not limited thereto.

The sensor element 300 can measure the angular velocity ωx around the X-axis. As illustrated in FIG. 13, such a sensor element 300 includes, for example, frame-like drive movable bodies 301A and 301B, drive springs 302A and 302B for supporting the drive movable bodies 301A and 301B so as to vibrate in the Y-axis direction, movable drive electrodes 303A and 303B coupled to the drive movable bodies 301A and 301B, first and second fixed drive electrodes 304A and 305A provided with the movable drive electrode 303A interposed therebetween, first and second fixed drive electrodes 304B and 305B provided with the movable drive electrode 303B interposed therebetween, detection movable bodies 306A and 306B provided inside the drive movable bodies 301A and 301B, detection springs 307A and 307B coupling the detection movable bodies 306A and 306B and the drive movable bodies 301A and 301B, first movable monitor electrodes 308A and 308B and second movable monitor electrodes 309A and 309B coupled to the drive movable bodies 301A and 301B, first fixed monitor electrodes 310A and 310B provided to face the first movable monitor electrodes 308A and 308B, and second fixed monitor electrodes 311A and 311B provided to face the second movable monitor electrodes 309A and 309B. Further, fixed detection electrodes 312A and 312B are provided on the bottom surface of the concave portion 23 so as to face the drive movable bodies 301A and 301B.

Although not illustrated, the detection movable bodies 306A and 306B are electrically coupled to the wiring 731, the first fixed drive electrodes 304A and 304B are electrically coupled to the wiring 732, the second fixed drive electrodes 305A and 305B are electrically coupled to the wiring 733, the fixed detection electrode 312A is electrically coupled to the wiring 734, the fixed detection electrode 312B is electrically coupled to the wiring 735, the first fixed monitor electrodes 310A and 310B are coupled to the wiring 736, and the second fixed monitor electrodes 311A and 311B are electrically coupled to the wiring 737.

Then, for example, a fixed voltage V11 illustrated in FIG. 16 is applied to the detection movable bodies 306A and 306B through the terminal 831. A voltage V12 illustrated in FIG. 16 is applied to the first fixed drive electrodes 304A and 304B through the terminal 832. A voltage V13 illustrated in FIG. 16 is applied to the second fixed drive electrodes 305A and 305B through the terminal 833. The fixed voltage V11 is, for example, 15 V, the voltage V12 is, for example, a voltage having amplitude of ±0.2 V with respect to the analog ground AGND, and the voltage V13 is, for example, a voltage, whose phase is opposite to the voltage V12, having amplitude of ±0.2 V with respect to the analog ground AGND. With this configuration, the drive movable bodies 301A and 301B are driven to vibrate in the Y-axis direction in opposite phases. During this drive vibration, a first pickup signal corresponding to the drive vibration is detected from the terminal 836, and a second pickup signal corresponding to the drive vibration is detected from the terminal 837. By feeding the first and second pickup signals back to the drive signals, that is, the voltages V12 and V13, the drive vibration of the drive movable bodies 301A and 301B is stabilized.

On the other hand, the fixed detection electrodes 312A and 312B are coupled to the charge amplifier through the terminals 834 and 835. For that reason, the capacitance Cx1 is formed between the detection movable body 306A and the fixed detection electrode 312A, and the capacitance Cx2 is formed between the detection movable body 306B and the fixed detection electrode 312B. When the angular velocity ωx around the X-axis is applied to the sensor element 300 in a state where the drive movable bodies 301A and 301B are in drive vibration, the detection movable bodies 306A and 306B are displaced in the Z-axis direction in opposite phases with each other by the Coriolis force, and accordingly the capacitances Cx1 and Cx2 change in opposite phases. For that reason, the amount of charge induced between the detection movable body 306A and the fixed detection electrode 312A and the amount of charge induced between the detection movable body 306B and the fixed detection electrode 312B also change based on the changes in the capacitances Cx1 and Cx2. When a difference occurs between the charge amount induced between the detection movable body 306A and the fixed detection electrode 312A and the charge amount induced between the detection movable body 306B and the fixed detection electrode 312B, the difference is output as the voltage value of the charge amplifier. In this way, the angular velocity ox received by the sensor element 300 can be obtained.

The sensor element 400 can measure the angular velocity coy around the Y-axis. Such a sensor element 400 is not particularly limited, but, for example, as illustrated in FIG. 14, can be configured by rotating the sensor element 300 described above by 90 degrees around the Z-axis.

That is, as illustrated in FIG. 14, such a sensor element 400 includes, for example, frame-like drive movable bodies 401A and 401B, drive springs 402A and 402B for supporting the drive movable bodies 401A and 401B so as to vibrate in the Y-axis direction, movable drive electrodes 403A and 403B coupled to the drive movable bodies 401A and 401B, first and second fixed drive electrodes 404A and 405A provided with the movable drive electrode 403A interposed therebetween, first and second fixed drive electrodes 404B and 405B provided with the movable drive electrode 403B interposed therebetween, detection movable bodies 406A and 406B provided inside the drive movable bodies 401A and 401B, detection springs 407A and 407B coupling the detection movable bodies 406A and 406B and the drive movable bodies 401A and 401B, first movable monitor electrodes 408A and 408B and second movable monitor electrodes 409A and 409B coupled to the drive movable bodies 401A and 401B, first fixed monitor electrodes 410A and 410B provided to face the first movable monitor electrodes 408A and 408B, and second fixed monitor electrodes 411A and 411B provided to face the second movable monitor electrodes 409A and 409B. Further, fixed detection electrodes 412A and 412B are provided on the bottom surface of the concave portion 24 so as to face the drive movable bodies 401A and 401B.

Although not illustrated, the detection movable bodies 406A and 406B are electrically coupled to the wiring 741, the first fixed drive electrodes 404A and 404B are electrically coupled to the wiring 742, the second fixed drive electrodes 405A and 405B are electrically coupled to the wiring 743, the fixed detection electrode 412A is electrically coupled to the wiring 744, the fixed detection electrode 412B is electrically coupled to the wiring 745, the first fixed monitor electrodes 410A and 410B are coupled to the wiring 746, and the second fixed monitor electrodes 411A and 411B are electrically coupled to the wiring 747.

Then, for example, the fixed voltage V11 illustrated in FIG. 16 is applied to the detection movable bodies 406A and 406B through the terminal 841. The voltage V12 illustrated in FIG. 16 is applied to the first fixed drive electrodes 404A and 404B through the terminal 842. The voltage V13 illustrated in FIG. 16 is applied to the second fixed drive electrodes 405A and 405B through the terminal 843. The fixed voltage V11 is, for example, 15 V, the voltage V12 is, for example, a voltage having amplitude of ±0.2 V with respect to the analog ground AGND, and the voltage V13 is, for example, a voltage, whose phase is opposite to the voltage V12, having amplitude of ±0.2 V with respect to the analog ground AGND. With this configuration, the drive movable bodies 401A and 401B are driven to vibrate in the X-axis direction in opposite phases. During this drive vibration, a first pickup signal corresponding to the drive vibration is detected from the terminal 846, and a second pickup signal corresponding to the drive vibration is detected from the terminal 847. By feeding the first and second pickup signals back to the drive signals, that is, the voltages V12 and V13, the drive vibration of the drive movable bodies 401A and 401B is stabilized.

On the other hand, the fixed detection electrodes 412A and 412B are coupled to the charge amplifier through the terminals 844 and 845. For that reason, the capacitance Cy1 is formed between the detection movable body 406A and the fixed detection electrode 412A, and the capacitance Cy2 is formed between the detection movable body 406B and the fixed detection electrode 412B. When the angular velocity coy around the Y-axis is applied to the sensor element 400 in a state where the drive movable bodies 401A and 401B are in drive vibration, the detection movable bodies 406A and 406B are displaced in the Z-axis direction in opposite phases with each other by the Coriolis force, and accordingly the capacitances Cy1 and Cy2 change in opposite phases. For that reason, the amount of charge induced between the detection movable body 406A and the fixed detection electrode 412A and the amount of charge induced between the detection movable body 406B and the fixed detection electrode 412B also change based on the changes in the capacitances Cy1 and Cy2. When a difference occurs between the charge amount induced between the detection movable body 406A and the fixed detection electrode 412A and the charge amount induced between the detection movable body 406B and the fixed detection electrode 412B, the difference is output as the voltage value of the charge amplifier. In this way, the angular velocity coy received by the sensor element 400 can be obtained.

The sensor element 500 can measure the angular velocity ωz around the Z-axis. Such a sensor element 500 is not particularly limited, but, as illustrated in FIG. 15, includes, for example, frame-like drive movable bodies 501A and 501B, drive springs 502A and 502B for supporting the drive movable bodies 501A and 501B so as to vibrate in the Y-axis direction, movable drive electrodes 503A and 503B coupled to the drive movable bodies 501A and 501B, first and second fixed drive electrodes 504A and 505A provided with the movable drive electrode 503A interposed therebetween, first and second fixed drive electrodes 504B and 505B provided with the movable drive electrode 503B interposed therebetween, frame-like detection movable bodies 506A and 506B provided inside the drive movable bodies 501A and 501B, detection springs 507A and 507B coupling the detection movable bodies 506A and 506B and the drive movable bodies 501A and 501B, first movable monitor electrodes 508A and 508B and second movable monitor electrodes 509A and 509B coupled to the drive movable bodies 501A and 501B, first fixed monitor electrodes 510A and 510B provided to face the first movable monitor electrodes 508A and 508B, second fixed monitor electrodes 511A and 511B provided to face the second movable monitor electrodes 509A and 509B, movable detection electrodes 512A and 512B supported by detection movable bodies 506A and 506B, the first and second fixed detection electrodes 513A and 514A provided with the movable detection electrode 512A interposed therebetween, and the first and second fixed detection electrodes 513B and 514B provided with the movable detection electrode 512B interposed therebetween.

Although not illustrated, the detection movable bodies 506A and 506B are electrically coupled to the wiring 751, the first fixed drive electrodes 504A and 504B are electrically coupled to the wiring 752, the second fixed drive electrodes 505A and 505B are electrically coupled to the wiring 753, the first fixed detection electrodes 513A and 513B are electrically coupled to the wiring 754, the second fixed detection electrodes 514A and 514B are electrically coupled to the wiring 755, the first fixed detection electrodes 510A and 510B are electrically coupled to the wiring 756, and the second fixed detection electrodes 511A and 511B are electrically coupled to the wiring 757.

Then, for example, the fixed voltage V11 illustrated in FIG. 16 is applied to the detection movable bodies 506A and 506B through the terminal 851, the voltage V12 illustrated in FIG. 16 is applied to the first fixed drive electrodes 504A and 504B through the terminal 852, the voltage V13 illustrated in FIG. 16 is applied to the second fixed drive electrodes 505A and 505B through the terminal 853. The fixed voltage V11 is, for example, 15 V, the voltage V12 is, for example, a voltage having amplitude of ±0.2 V with respect to the analog ground AGND, and the voltage V13 is, for example, a voltage, whose phase is opposite to the voltage V12, having amplitude of ±0.2 V with respect to the analog ground AGND. With this configuration, the drive movable bodies 501A and 501B are driven to vibrate in the Y-axis direction in opposite phases. During this drive vibration, a first pickup signal corresponding to the drive vibration is detected from the terminal 856, and a second pickup signal corresponding to the drive vibration is detected from the terminal 857. By feeding the first and second pickup signals back to the drive signals, that is, the voltages V12 and V13, the drive vibration of the drive movable bodies 501A and 501B is stabilized.

On the other hand, the first fixed detection electrodes 513A and 513B are coupled to the charge amplifier through the terminal 854, and the second fixed detection electrodes 514A and 514B are coupled to the charge amplifier through the terminal 855. For that reason, the capacitance Cz1 is formed between the movable detection electrodes 512A and 512B and the first fixed detection electrodes 513A and 513B, and the capacitance Cz2 is formed between the movable detection electrodes 512A and 512B and the second fixed detection electrodes 514A and 514B. When the angular velocity ωz around the Z-axis is applied to the sensor element 500 in a state where the drive movable bodies 501A and 501B are in drive vibration, the detection movable bodies 506A and 506B are displaced in the X-axis direction in opposite phases with each other by the Coriolis force, and accordingly the capacitances Cz1 and Cz2 change in opposite phases. For that reason, the amount of charge induced between the movable detection electrode 512A and the first fixed detection electrode 513A and the amount of charge induced between the movable detection electrode 512B and the first fixed detection electrode 513B also change based on the changes in the capacitances Cz1 and Cz2. When a difference occurs between the charge amount induced between the movable detection electrode 512A and the first fixed detection electrode 513A and the charge amount induced between the movable detection electrode 512B and the first fixed detection electrode 513B, the difference is output as the voltage value of the charge amplifier. In this way, the angular velocity ωz received by the sensor element 500 can be obtained.

Thus, although the sensor elements 300, 400, and 500 have been described, the configurations of the sensor elements 300, 400, and 500 are not particularly limited as long as the angular velocities ωx, ωy, and ωz can be detected.

Next, the disposition of the terminals 831 to 837, 841 to 847, and 851 to 857 will be described in more detail. The terminals 831 to 837 are electrically coupled to the sensor element 300, and among these terminals 831 to 837, the terminals 831, 832 and 833 are input terminals for applying voltages V11, V12, and V13 to the sensor element 300, the terminals 834 and 835 are detection terminals for detecting a detection signal of the sensor element 300, that is, charges corresponding to the capacitances Cx1 and Cx2, and the terminals 836 and 837 are detection terminals for detecting the first and second pickup signals of the sensor element 300. Similarly, the terminals 841 to 847 are electrically coupled to the sensor element 400, and among these terminals 841 to 847, the terminals 841, 842 and 843 are input terminals for applying voltages V11, V12, and V13 to the sensor element 400, the terminals 844 and 845 are detection terminals for detecting a detection signal of the sensor element 400, that is, charges corresponding to the capacitances Cy1 and Cy2, and the terminals 846 and 847 are detection terminals for detecting the first and second pickup signals of the sensor element 400. Similarly, the terminals 851 to 857 are electrically coupled to the sensor element 500, and among these terminals 851 to 857, the terminals 851, 852 and 853 are input terminals for applying voltages V11, V12, and V13 to the sensor element 500, the terminals 854 and 855 are detection terminals for detecting a detection signal of the sensor element 500, that is, charges corresponding to the capacitances Cz1 and Cz2, and the terminals 856 and 857 are detection terminals for detecting the first and second pickup signals of the sensor element 500.

As illustrated in FIG. 12, the terminals 831, 832, 833, 841, 842, 843, 851, 852, and 853 that are the input terminals are provided closer to the lid 6 than the terminals 834, 835, 836, 837, 844, 845, 846, 847, 854, 855, 856, and 857 that are the detection terminals. The terminals 831, 832, 833, 841, 842, 843, 851, 852, and 853, which are input terminals, are respectively provided in a row along the imaginary line α1, and the terminals 834, 835, 836, 837, 844, 845, 846, 847, 854, 855, 856, and 857, are provided in a row on the imaginary line α2.

According to the fourth embodiment as described above, the same effects as those of the first embodiment described above can be exhibited.

Fifth Embodiment

Figure 17:
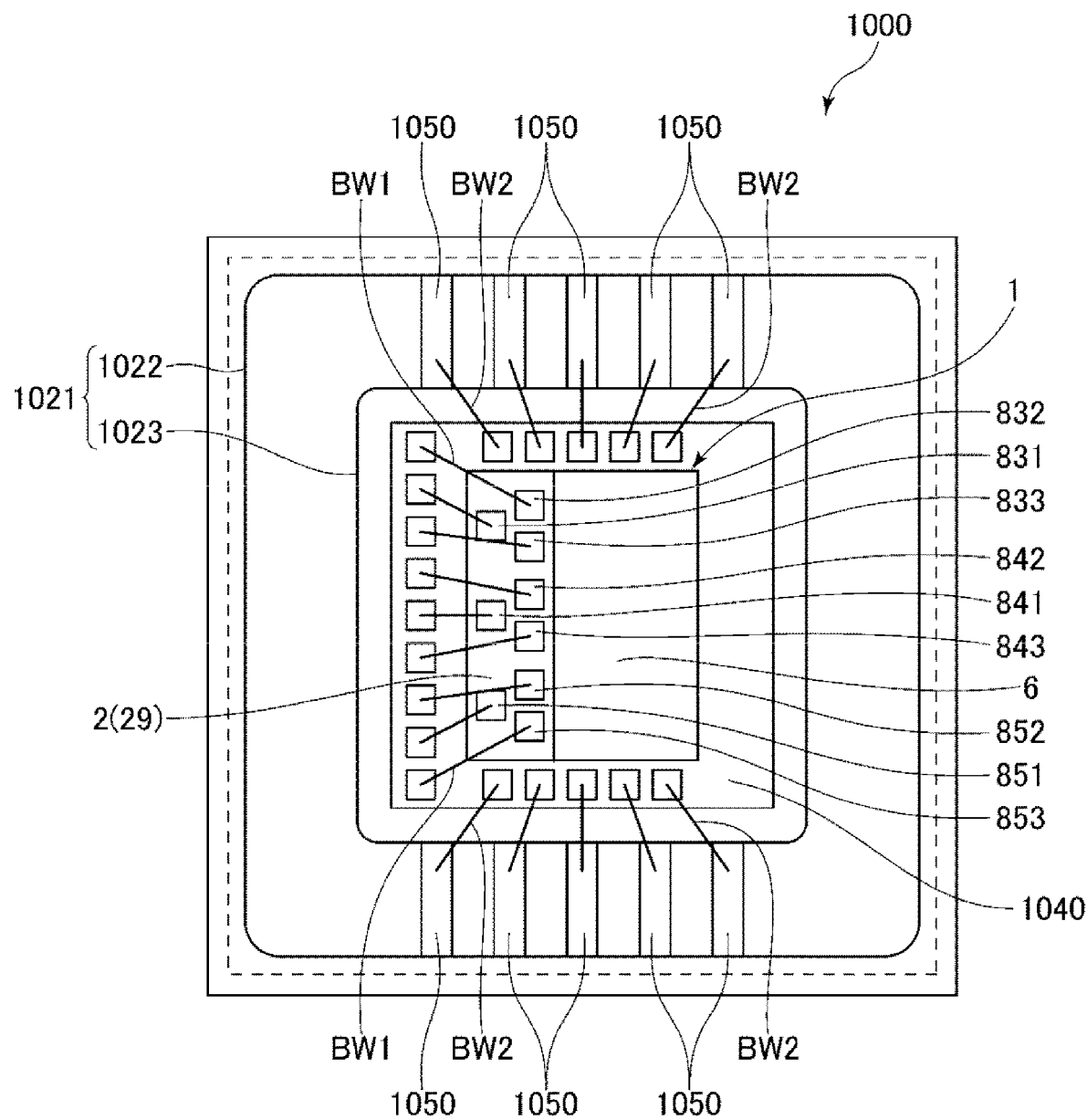
FIG. 17 is a plan view illustrating an inertial sensor unit according to a fifth embodiment.
Figure 18:
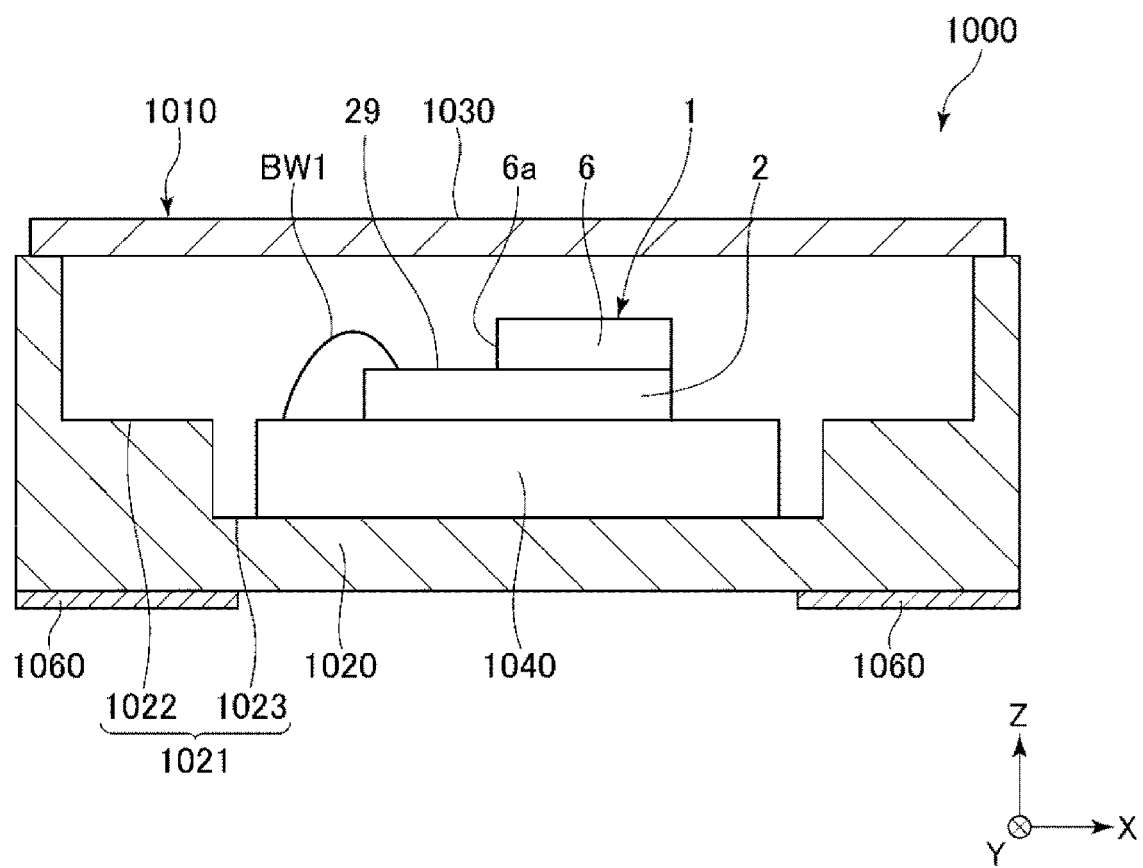
FIG. 18 is a cross-sectional view of the inertial sensor unit illustrated in FIG. 17.

FIG. 17 is a plan view illustrating an inertial sensor unit of a fifth embodiment. FIG. 18 is across-sectional view of the inertial sensor unit illustrated in FIG. 17.

An inertial sensor unit 1000 illustrated in FIGS. 17 and 18 includes a package 1010, an IC chip 1040 and an inertial sensor 1 that are accommodated in the package 1010. In the IC chip 1040, for example, a drive control circuit that controls driving of the inertial sensor 1 and a detection circuit that measures accelerations Ax, Ay, and Az based on detection signals from the inertial sensor 1 are included. In the fifth embodiment, the configuration of the first embodiment described above is used as the configuration of the inertial sensor 1, but the configuration of the inertial sensor 1 is not particularly limited thereto.

The package 1010 includes a base substrate 1020 having a concave portion 1021 which opens to the upper surface, and a lid 1030 bonded to the upper surface of the base substrate 1020 so as to close the opening of the concave portion 1021. The concave portion 1021 includes a first concave portion 1022 which opens to the upper surface of the base substrate 1020 and a second concave portion 1023 which opens to the bottom surface of the first concave portion 1022. The IC chip 1040 is mounted on the bottom surface of the second concave portion 1023 and the inertial sensor 1 is mounted on the IC chip 1040. The terminals 831 to 833, 841 to 843, and 851 to 853 of the inertial sensor 1 are electrically coupled to corresponding terminals of the IC chip 1040 through bonding wires BW1. Since the terminals 831 to 833, 841 to 843, and 851 to 853 of the inertial sensor 1 are disposed as described above, terminal installation portions of the inertial sensor 1 and the IC chip 1040 can be reduced in size and workability of the bonding wires BW1 is improved.

A plurality of internal terminals 1050 that are electrically coupled to the IC chip 1040 through bonding wires BW2 are provided on the bottom surface of the first concave portion 1022. A plurality of external terminals 1060 that are electrically coupled to the plurality of internal terminals 1050 through internal wirings (not illustrated) provided in the base substrate 1020 are provided on the lower surface of the base substrate 1020.

Such an inertial sensor unit 1000 includes the inertial sensor 1. For that reason, the effects of the inertial sensor 1 described above can be obtained and high reliability can be exhibited.

Sixth Embodiment

Figure 19:
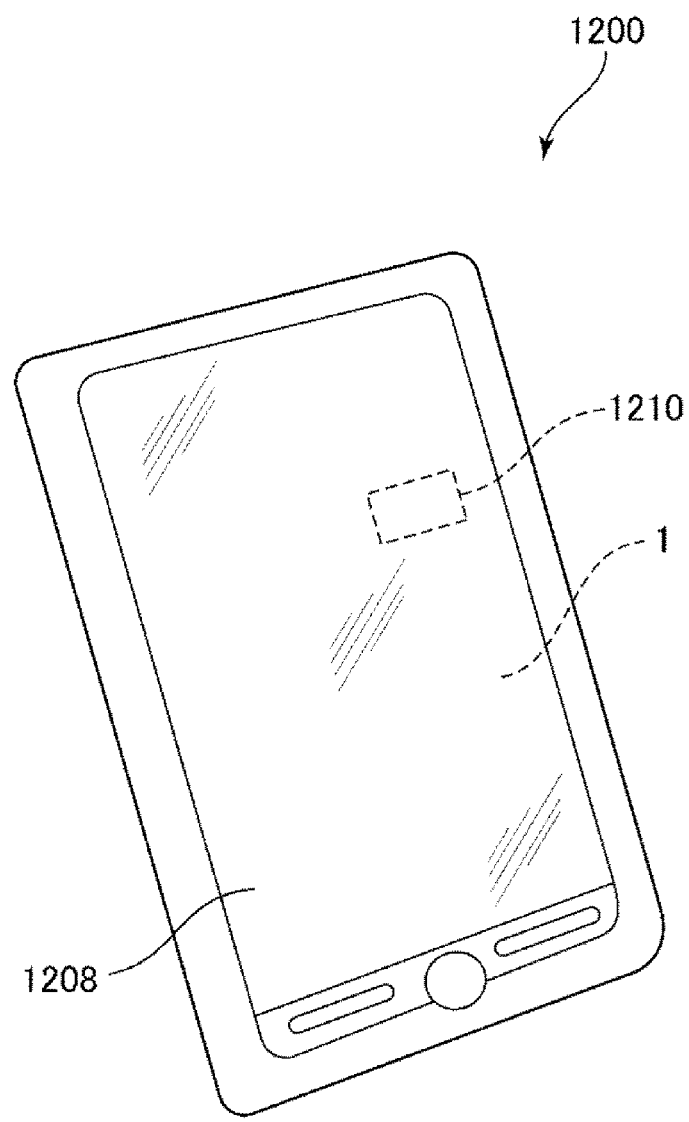
FIG. 19 is a plan view illustrating a smartphone according to a sixth embodiment.

FIG. 19 is a plan view illustrating a smartphone of a sixth embodiment.

In a smartphone 1200 illustrated in FIG. 19, the inertial sensor 1 and a control circuit 1210 that performs control based on detection signals output from the inertial sensor 1 are incorporated. Detection data measured by the inertial sensor 1 is transmitted to the control circuit 1210, and the control circuit 1210 can recognize the attitude and behavior of the smartphone 1200 from the received detection data, change a display image displayed on a display unit 1208, generate an alarm sound or sound effect, or drive the vibration motor to vibrate the main body.

Such a smartphone 1200 as an electronic device includes the inertial sensor 1 and the control circuit 1210 that performs control based on a detection signal from the inertial sensor 1. For that reason, the effect of the inertial sensor 1 described above can be obtained and high reliability can be exhibited.

The electronic device incorporating the inertial sensor 1 is not particularly limited, and includes, for example, a personal computer, a digital still camera, a tablet terminal, a timepiece, a smart watch, an ink jet printer, a laptop personal computer, a TV, a wearable terminals such as HMD (head mounted display), a video camera, a video tape recorder, a car navigation device, a pager, an electronic datebook, an electronic dictionary, a calculator, an electronic game machines, a word processor, a work station, a videophone, a security TV monitor, an electronic binoculars, a POS terminal, medical equipment, a fish finder, various measuring instruments, mobile terminal base station equipment, various instruments of vehicles, aircraft, and ships, a flight simulator, a network server, and the like, in addition to the smartphone 1200.

Seventh Embodiment

Figure 20:
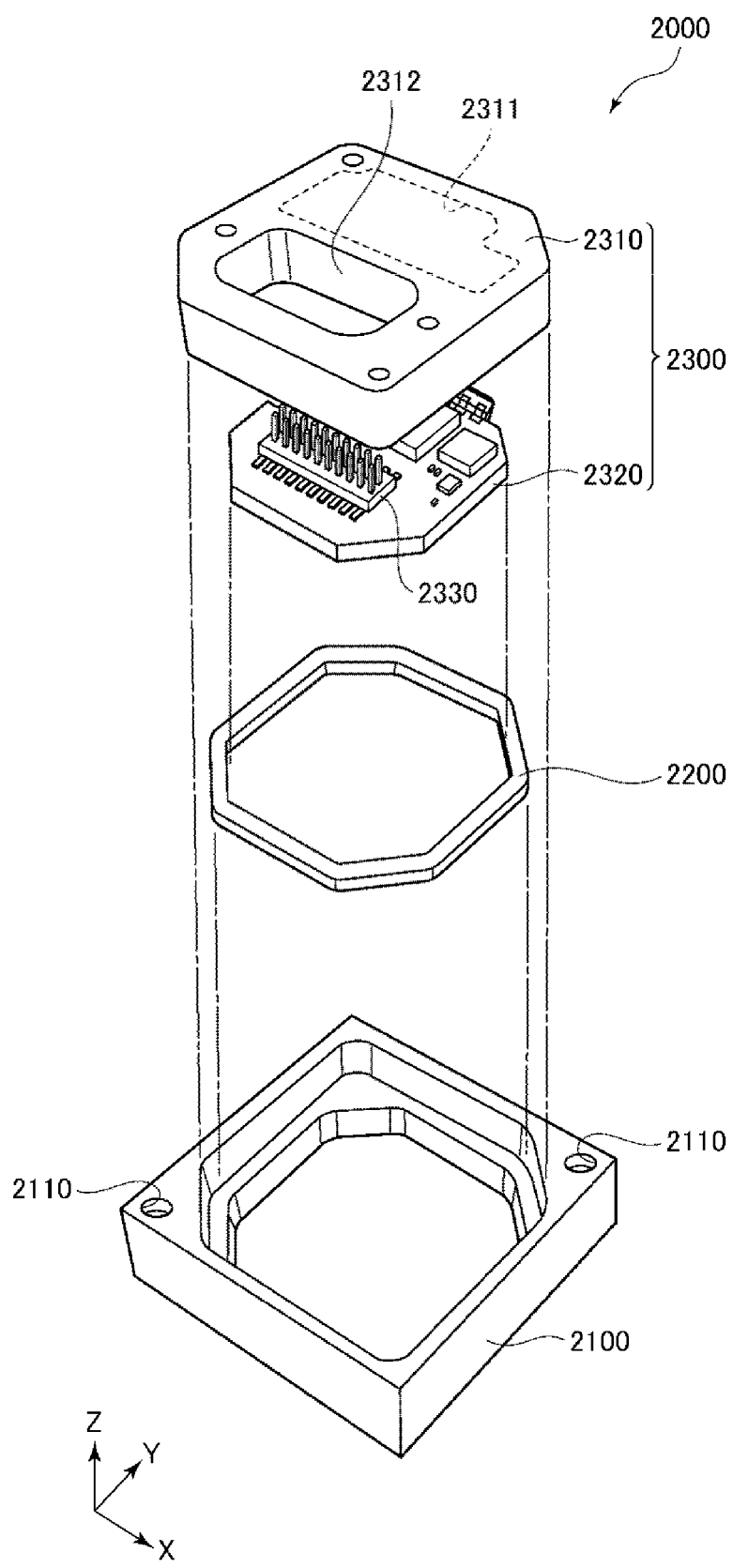
FIG. 20 is an exploded perspective view illustrating an inertial measurement device according to a seventh embodiment.
Figure 21:
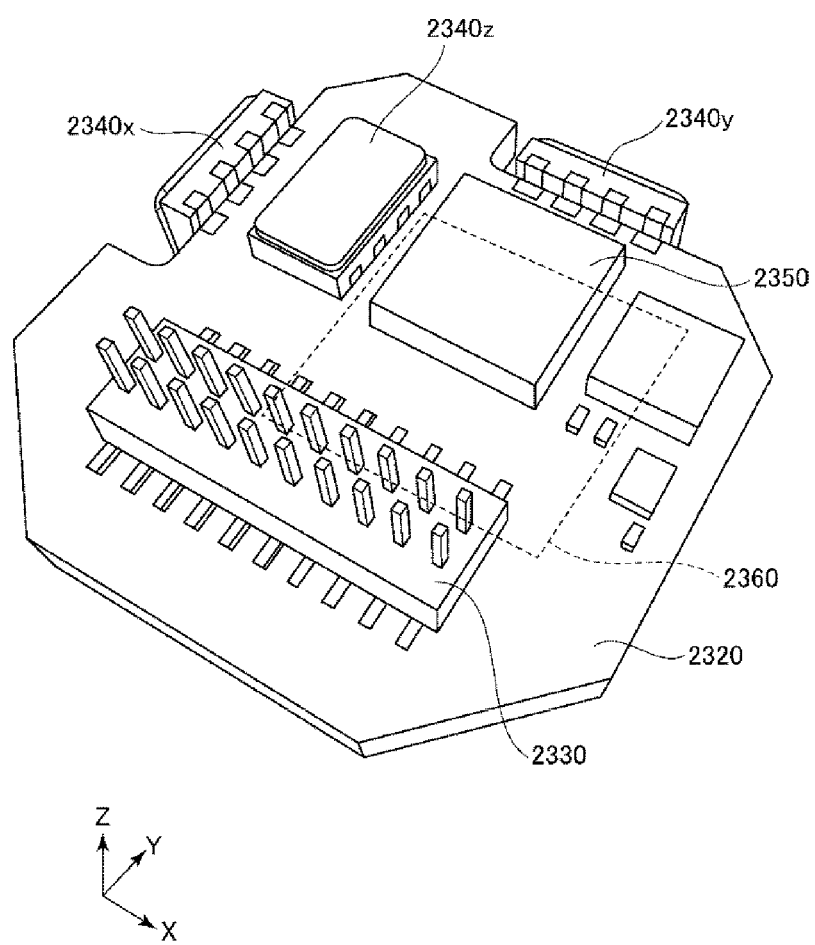
FIG. 21 is a perspective view of a substrate included in the inertial measurement device illustrated in FIG. 20.

FIG. 20 is an exploded perspective view illustrating an inertia measurement device according to a seventh embodiment. FIG. 21 is a perspective view of a substrate included in the inertia measurement device illustrated in FIG. 20.

An inertia measurement device 2000 (IMU: Inertial measurement Unit) illustrated in FIG. 20 is an inertia measurement device that detects the attitude and behavior of an amounted device such as an automobile or a robot. The inertia measurement device 2000 functions as a six-axis motion sensor including three-axis acceleration sensors and three-axis angular velocity sensors.

The inertia measurement device 2000 is a rectangular parallelepiped having a substantially square planar shape. Screw holes 2110 as fixed portions are formed in the vicinity of two vertices positioned in the diagonal direction of the square. Through two screws in the two screw holes 2110, the inertia measurement device 2000 can be fixed to the mounted surface of the mounted object such as an automobile. The size of the inertia measurement device 2000 can be reduced such that the device can be mounted on a smartphone or a digital still camera, for example, by selection of parts or design change.

The inertia measurement device 2000 has a configuration in which an outer case 2100, a bonding member 2200, and a sensor module 2300 are included and the sensor module 2300 is inserted in the outer case 2100 with the bonding member 2200 interposed therebetween. Similarly to the overall shape of the inertia measurement device 2000 described above, the outer shape of the outer case 2100 is a rectangular parallelepiped having a substantially square planar shape, and screw holes 2110 are formed in the vicinity of two vertices positioned in the diagonal direction of the square. In addition, the outer case 2100 has a box shape and the sensor module 2300 is accommodated therein.

Further, the sensor module 2300 includes an inner case 2310 and a substrate 2320. The inner case 2310 is a member for supporting the substrate 2320, and has a shape that fits inside the outer case 2100. A concave portion 2311 for suppressing contact with the substrate 2320 and an opening 2312 for exposing a connector 2330 described later are formed in the inner case 2310. Such an inner case 2310 is bonded to the outer case 2100 through the bonding member 2200. The substrate 2320 is bonded to the lower surface of the inner case 2310 through an adhesive.

As illustrated in FIG. 21, the connector 2330, an angular velocity sensor 2340ωz for measuring the angular velocity around the Z-axis, an acceleration sensor 2350 for measuring acceleration in each axis direction of the X-axis, the Y-axis, and the Z-axis and the like are mounted on the upper surface of the substrate 2320. An angular velocity sensor 2340x for measuring the angular velocity around the X-axis and an angular velocity sensor 2340y for measuring the angular velocity around the Y-axis are mounted on the side surface of the substrate 2320. As these sensors, the inertial sensor of the embodiments can be used.

A control IC 2360 is mounted on the lower surface of the substrate 2320. The control IC 2360 is a micro controller unit (MCU) and controls each unit of the inertia measurement device 2000. Ina storing unit, programs defining the order and contents for measuring the acceleration and angular velocity, programs for digitizing detected data and incorporating the detected data into packet data, accompanying data, and the like are stored. In addition, a plurality of electronic components are mounted on the substrate 2320.

Eighth Embodiment

Figure 22:
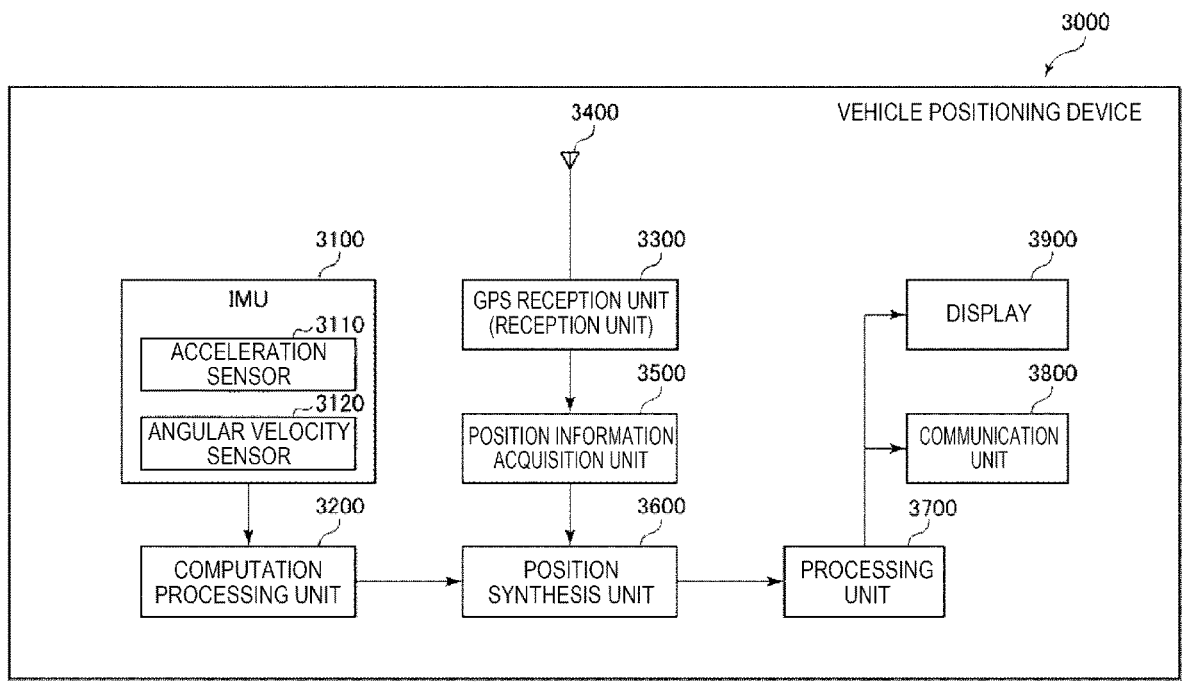
FIG. 22 is a block diagram illustrating an entire system of a vehicle positioning device according to an eighth embodiment.
Figure 23:
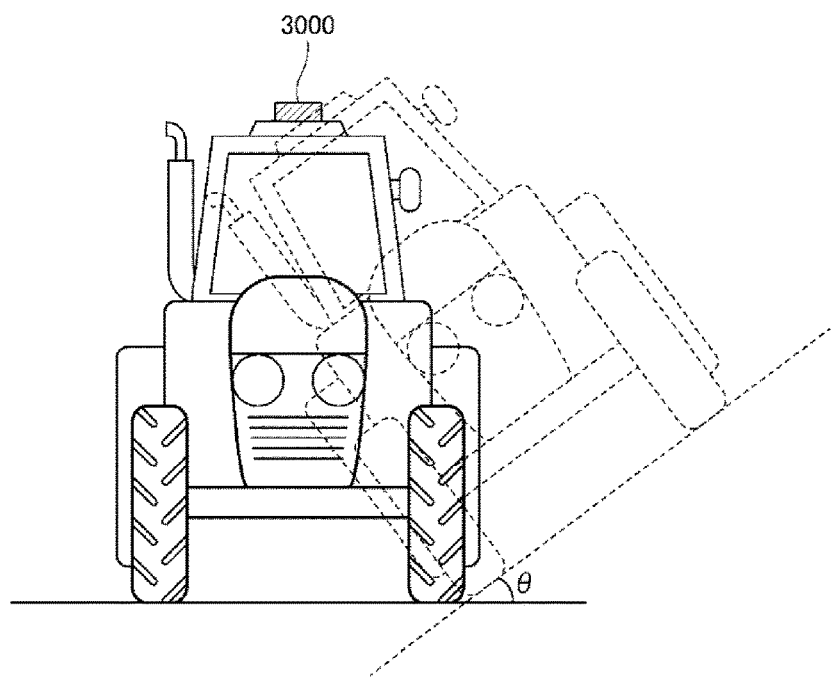
FIG. 23 is a diagram illustrating an operation of the vehicle positioning device illustrated in FIG. 22.

FIG. 22 is a block diagram illustrating the entire system of a vehicle positioning device according to an eighth embodiment. FIG. 23 is a diagram illustrating the operation of the vehicle positioning device illustrated in FIG. 22.

A vehicle positioning device 3000 illustrated in FIG. 22 is a device which is used by being mounted on a vehicle and performs positioning of the vehicle. The vehicle is not particularly limited, and may be any of a bicycle, an automobile, a motorcycle, a train, an airplane, a ship, and the like, but in the eighth embodiment, description will be made on a four-wheeled automobile as the vehicle.

The vehicle positioning device 3000 includes an inertia measurement device 3100 (IMU), a computation processing unit 3200, a GPS reception unit 3300, a receiving antenna 3400, a position information acquisition unit 3500, a position synthesis unit 3600, a processing unit 3700, a communication unit 3800, and a display 3900. As the inertia measurement device 3100, for example, the inertia measurement device 2000 described above can be used.

The inertia measurement device 3100 includes a tri-axis acceleration sensor 3110 and a tri-axis angular velocity sensor 3120. The computation processing unit 3200 receives acceleration data from the acceleration sensor 3110 and angular velocity data from the angular velocity sensor 3120, performs inertial navigation computation processing on these data, and outputs inertial navigation positioning data including acceleration and attitude of the vehicle.

The GPS reception unit 3300 receives a signal from the GPS satellite through the receiving antenna 3400. Further, the position information acquisition unit 3500 outputs GPS positioning data representing the position (latitude, longitude, altitude), speed, direction of the vehicle positioning device 3000 based on the signal received by the GPS reception unit 3300. The GPS positioning data also includes status data indicating a reception state, a reception time, and the like.

Based on inertial navigation positioning data output from the computation processing unit 3200 and the GPS positioning data output from the position information acquisition unit 3500, the position synthesis unit 3600 calculates the position of the vehicle, more specifically, the position on the ground where the vehicle is traveling. For example, even if the position of the vehicle included in the GPS positioning data is the same, as illustrated in FIG. 23, if the attitude of the vehicle is different due to the influence of inclination θ of the ground or the like, the vehicle is traveling at different positions on the ground. For that reason, it is impossible to calculate an accurate position of the vehicle with only GPS positioning data. Therefore, the position synthesis unit 3600 calculates the position on the ground where the vehicle is traveling, using inertial navigation positioning data.

The position data output from the position synthesis unit 3600 is subjected to predetermined processing by the processing unit 3700 and displayed on the display 3900 as a positioning result. Further, the position data may be transmitted to the external apparatus by the communication unit 3800.

Ninth Embodiment

Figure 24:
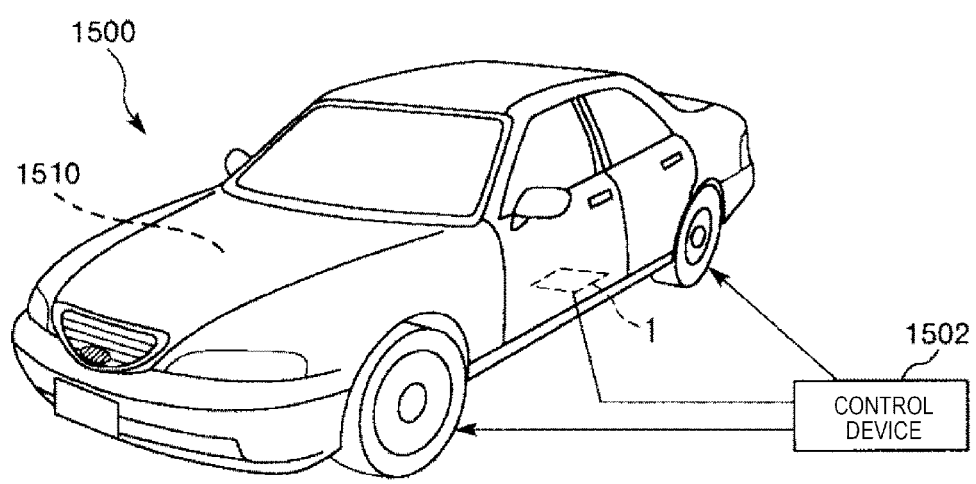
FIG. 24 is a perspective view illustrating a vehicle according to a ninth embodiment.

FIG. 24 is a perspective view illustrating a vehicle according to a ninth embodiment of the disclosure.

An automobile 1500 as the vehicle illustrated in FIG. 24 is an automobile and includes at least one system 1510 of an engine system, a brake system, and a keyless entry system. The inertial sensor 1 is incorporated in the automobile 1500, and the attitude of the vehicle body can be measured by the inertial sensor 1. The detection signal of the inertial sensor 1 is supplied to a control device 1502, and the control device 1502 can control the system 1510 based on the signal.

As such, the automobile 1500 as the vehicle includes the inertial sensor 1 and the control device 1502 that performs control based on the detection signal from the inertial sensor 1. For that reason, the effect of the inertial sensor 1 described above can be obtained and high reliability can be exhibited.

In addition, the inertial sensor 1 can also be widely applied to a car navigation system, a car air conditioner, an anti-lock braking system (ABS), an air bag, a tire pressure monitoring system (TPMS), an engine controller, and an electronic control unit (ECU) such as a battery monitor of a hybrid car or an electric automobile. Also, the vehicle is not limited to the automobile 1500, but can also be applied to an airplane, a rocket, a satellite, a ship, an automated guided vehicle (AGV), a biped walking robot, an unmanned airplane such as a drone, and the like.

Although the inertial sensor according to the present disclosure, the electronic device, and the vehicle according to the present disclosure have been described based on the embodiments, the disclosure is not limited thereto. The configuration of each unit can be replaced with any configuration having the same function. In the embodiments described above, the configuration in which the sensor element measures acceleration is described, but is not limited thereto, and for example, a configuration in which angular velocity is detected may be adopted.

What is claimed is:

1. An inertial sensor comprising:
   a substrate;
   a sensor element that is provided on the substrate;
   a lid that covers the sensor element and is bonded to the substrate, an accommodation space being formed between the lid and the substrate, the accommodation space being filled with an inert gas; and
   a plurality of terminals that are positioned outside the lid and electrically coupled to the sensor element, wherein
   the plurality of terminals include
   a first number of input terminals to each of which an electrical signal is input, and
   a second number of detection terminals for detecting a signal from the sensor element,
   the second number is greater than the first number,
   the first number of input terminals are disposed in a first row in a second direction that intersects a first direction,
   the second number of detection terminals are disposed in a second row in the second direction,
   the first row is a first distance L1 away from the lid in the first direction,
   the second row is a second distance L2 away from the lid in the first direction, and
   L2<L1/L2<10, such that the first row having a fewer number of terminals is further away in the first direction from the lid than the second row having a greater number of terminals,
   each of the plurality of detection terminals is rectangular shaped, and
   each of the plurality of terminals is adjacent and connected to a circular-shaped inspection terminal.

2. The inertial sensor according to claim 1, further comprising:
   an input wiring electrically coupling each input terminal and the sensor element, wherein
   the second number of detection terminals include a first detection terminal and a second detection terminal, and
   the input wiring is provided between the first detection terminal and the second detection terminal.

3. The inertial sensor according to claim 2, wherein
   the plurality of terminals are respectively positioned at one side in the first direction with respect to the lid.

4. The inertial sensor according to claim 3, wherein
   the first detection terminal and the second detection terminal at least partially overlap a region formed by extending the input terminal in the first direction.

5. The inertial sensor according to claim 2, further comprising:
   a first detection wiring that electrically couples the first detection terminal and the sensor element; and
   a second detection wiring that electrically couples the second detection terminal and the sensor element, wherein
   the first detection wiring and the second detection wiring have the same length.

6. The inertial sensor according to claim 1, wherein
   the plurality of terminals are provided on the substrate.

7. The inertial sensor according to claim 1, wherein
   the plurality of terminals are provided on a mounting table provided on the substrate and made of the same material as the sensor element.

8. The inertial sensor according to claim 1, further comprising:
   a bonding member that is provided between the substrate and the lid and bonds the substrate and the lid, wherein the bonding member contains the same material as the plurality of terminals.

9. The inertial sensor according to claim 1, wherein a shape of the plurality of inspection terminals in plan view is a rotation target.

10. An electronic device comprising:
the inertial sensor according to claim 1; and
a control circuit that performs control based on a detection signal from the inertial sensor.

11. A vehicle comprising:
the inertial sensor according to claim 1; and
a control device that performs control based on a detection signal from the inertial sensor.

12. The inertial sensor according to claim 1, the inert gas within the accommodation space being at atmospheric pressure.

* * * * *